US007555429B2

(12) United States Patent
Kondo et al.

(10) Patent No.: US 7,555,429 B2
(45) Date of Patent: Jun. 30, 2009

(54) SOUND SIGNAL PROCESSING APPARATUS AND DEGREE OF SPEECH COMPUTATION METHOD

(75) Inventors: Tetsujiro Kondo, Tokyo (JP); Junichi Shima, Kanagawa (JP); Hiroshi Ichiki, Kanagawa (JP); Akihiko Arimitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 749 days.

(21) Appl. No.: 11/169,667

(22) Filed: Jun. 30, 2005

(65) Prior Publication Data

US 2006/0004568 A1 Jan. 5, 2006

(30) Foreign Application Priority Data

Jun. 30, 2004 (JP) ............................ 2004-194646

(51) Int. Cl.
*G10L 11/06* (2006.01)
*G10L 19/00* (2006.01)
*G10L 21/00* (2006.01)
*G10L 15/00* (2006.01)

(52) U.S. Cl. ........................ 704/213; 704/215; 704/233

(58) Field of Classification Search ................ 704/213, 704/215

See application file for complete search history.

(56) References Cited

U.S. PATENT DOCUMENTS 3,940,565 A * 2/1976 Lindenberg ................ 704/253
2004/0049380 A1 * 3/2004 Ehara et al. ................ 704/219

* cited by examiner

*Primary Examiner*—David R Hudspeth
*Assistant Examiner*—Justin W Rider
(74) *Attorney, Agent, or Firm*—Oblon, Spivak, McClelland, Maier & Neustadt, P.C.

(57) ABSTRACT

Speech likeliness or a degree of speech is determined with a simple configuration or with a small amount of processing, and speech parts are separated from an input sound signal. The input sound signal is subjected to a waveform slicing process in frame units. The increase and decrease rate of a half wavelength in the frame is computed. The rate of a zero cross in the frame is computed. The increase and decrease rate of a half wavelength is computed by determining the rate of the portion where the upward half-wavelength or the downward half-wavelength of the waveform of the input sound signal changes to increase and decrease alternately or to decrease and increase alternately. The degree of speech is determined using each rate. Speech processing for separating or accentuating/attenuating speech and background noise in accordance with the degree of speech is performed on the sound signal for each frame.

17 Claims, 21 Drawing Sheets

| JITTER | LARGE/MUCH | SMALL/LITTLE |
|---|---|---|
| JITTER OF WAVELENGTH | SPEECH | AMBIENT SOUND |
| JITTER OF LEVEL DIRECTION | AMBIENT SOUND | SPEECH |

SOUND SIGNAL PROCESSING APPARATUS AND DEGREE OF SPEECH COMPUTATION METHOD

BACKGROUND OF THE INVENTION

1. Field of the Invention

The present invention relates to a sound signal processing apparatus used to separate speech from an input sound signal containing ambient sound such as ambient noise, background noise, etc., and speech and used to attenuate ambient sound so as to accentuate speech, and relates to a degree of speech computation method for use with the sound signal processing apparatus.

2. Description of the Related Art

In applications such as mobile phones and speech recognition, it is desirably to suppress noise such as ambient noise and background noise, which is contained in a picked-up sound signal or an audible signal in order to accentuate speech components and to separate noise and speech.

As such, a conventional technology for separating speech and noise, as disclosed in, for example, Japanese Unexamined Patent Application Publication Nos. 2000-81900 and 8-79897, a method for separating speech and noise from differences in sound signals received by each microphone by using a plurality of microphones is known. Furthermore, as disclosed in Japanese Unexamined Patent Application Publication Nos. 2001-42886 and 2000-222000, a method of learning ambient sound at the time of a particular timing is known. In, for example, Japanese Unexamined Patent Application Publication No. 2003-70097, a method is disclosed in which the minimum average amplitude value in a fixed period is assumed as noise, and a determination as to ambient sound and speech is made based on the magnitude relationship with that value.

As recognized by the present inventors, the above-described conventional technologies have the following problems.

In the case of the technologies disclosed in Japanese Unexamined Patent Application Publication Nos. 2000-81900 and 8-79897, in which a plurality of microphones are used, it is required that the microphones be at a minimum fixed spacing or more. In the case of a directional microphone, the direction needs to be changed in accordance with the movement of a target.

In the case of the technologies disclosed in Japanese Unexamined Patent Application Publication Nos. 2001-42886 and 2000-222000, in which ambient sound is learned, ambient sound of a time that is necessary and sufficient for learning is required, and the technologies lack general versatility.

In the case of the technology disclosed in Japanese Unexamined Patent Application Publication No. 2003-70097, it is not possible to cope with noise of a large amplitude, and a determination is difficult when the entirety of a fixed period is only speech or only ambient sound.

SUMMARY OF THE INVENTION

The present invention has been made in view of the limitations of such conventional systems and methods. An object of the present invention is to address the above-identified and other limitations of conventional systems and methods by, for instance, providing a sound signal processing apparatus that is capable of determining speech likeliness or a degree of speech with a simple configuration or with a small amount of processing by using, as an input, a sound signal picked up by one microphone or played back from a recording medium, and that is capable of easily performing speech separation or noise suppression and speech accentuation on an input sound signal, and to provide a degree of speech computation method for use with the sound signal processing apparatus.

To achieve the above-mentioned object, in one aspect, the present invention provides a processor-implemented sound signal processing apparatus comprising: a degree of vocally generated sound computation mechanism configured to compute and output an indicia of a degree of vocally generated sound of a sound signal input thereto, the sound signal including a vocally generated sound and ambient sound; and a voice processor configured to characterize the input sound signal based on the indicia of degree of vocally generated sound output by the degree of vocally generated sound computation mechanism, wherein the degree of vocally generated sound computation mechanism is configured to compute the indicia of degree of vocally generated sound based on features in a wavelength direction of a waveform of the input sound signal. (The wavelength direction is, in other words, time direction.)

The degree of vocally generated sound computation mechanism may includes a degree of speech computation mechanism; the vocally generated sound is speech; and the voice processor is configured to characterize the input sound signal based on the degree of speech in the sound signal as determined by the degree of vocally generated sound computation mechanism.

The features in the wavelength direction are typically changes in a duration of a period of waveform of the sound signal or changes in a level direction of the waveform of the sound signal.

The degree of speech computation mechanism may be configured to compute the degree of speech in units of frames sliced in predetermined time length units of the sound signal.

The degree of speech computation mechanism may comprise: a half-wavelength increase and decrease repetition rate computation mechanism configured to compute an increase and a decrease in repetition rate of half wavelengths of a waveform of the sound signal; a zero-cross rate computation mechanism configured to compute a rate of zero crossings of half wavelengths of the waveform of the sound signal; and a degree of vocally generated sound output mechanism configured to output the indicia of degree of vocally generated sound on the basis of an output from the half-wavelength increase and decrease repetition rate computation mechanism and an output from the zero-cross rate computation mechanism.

The half-wavelength increase and decrease repetition rate computation mechanism may be configured to compute the increase and decrease repetition rate of the half wavelength of the waveform based on a rate of a portion of the waveform where an upward half-wavelength of the waveform of the sound signal changes so as to increase and decrease alternately or changes so as to decrease and increase alternately, and based on a rate of a portion where a downward half-wavelength of the waveform of the sound signal changes so as to increase and decrease alternately or changes so as to decrease and increase alternately.

The half-wavelength increase and decrease repetition rate computation mechanism may include a first output value adjustment mechanism configured to adjust the repetition rate of the half wavelengths produced by the half-wavelength increase and decrease repetition rate computation mechanism, the zero-cross rate computation mechanism includes a second output value adjustment mechanism configured to adjust the rate of zero-crossings produced by the zero-cross rate computation mechanism, and the first and second output value adjustment mechanisms are configured to adjust and provide respective output values to the degree of vocally generated sound output mechanism.

The processor-implemented sound signal processing apparatus further comprises: a band dividing mechanism configured to divide the sound signal into a plurality of frequency bands, wherein the degree of vocally generated sound computation mechanism is configured to compute the indicia of degree of vocally generated sound for each band, and the voice processor is configured to process each band on the basis of the computed degree of vocally generated sound of each band.

In another aspect, the present invention provides a method for computing an indicia of degree of vocally generated sound, comprising steps of: slicing a waveform of an input sound signal in units of frames of a predetermined length; computing and outputting the indicia of a degree of vocally generated sound of a sound signal input thereto, the sound signal including a vocally generated sound and ambient sound; and characterizing the input sound signal based on the indicia of degree of vocally generated sound; wherein the computing step includes computing the indicia of degree of vocally generated sound based on features in a wavelength direction of a waveform of the input sound signal.

In another aspect, the present invention provides a computer program product having computer readable instructions that when executed by a processor implement a processing comprising steps of: slicing a waveform of an input sound signal in units of frames of a predetermined length; computing and outputting the indicia of a degree of vocally generated sound of a sound signal input thereto, the sound signal including a vocally generated sound and ambient sound; and characterizing the input sound signal based on the indicia of degree of vocally generated sound; wherein the computing step includes computing the indicia of degree of vocally generated sound based on features in a wavelength direction of a waveform of the input sound signal.

In the other aspect, the present invention provides a processor-implemented sound signal processing apparatus comprising: means for slicing a waveform of an input sound signal in units of frames of a predetermined length;

means for computing and outputting an indicia of a degree of vocally generated sound of a sound signal input thereto from the means for slicing, the sound signal including a vocally generated sound and ambient sound; and means for characterizing the input sound signal based on the indicia of degree of vocally generated sound; wherein the means for computing includes means for calculating the indicia of degree of vocally generated sound based on features in a wavelength direction of a waveform of the input sound signal.

In the present invention, the input sound signal is subjected to a waveform slicing process in frame units, the increase and decrease rate of a half wavelength in a frame is computed, the zero-cross rate in a frame is computed, and the degree of vocally generated sound is determined using each of the computed rates. In accordance with this determined degree of vocally generated sound, a process for separating or accentuating/attenuating vocally generated sound and background noise is performed.

DETAILED DESCRIPTION OF THE INVENTION

Specific embodiments to which the present invention is applied will now be described below in detail with reference to the drawings.

Figure 1:
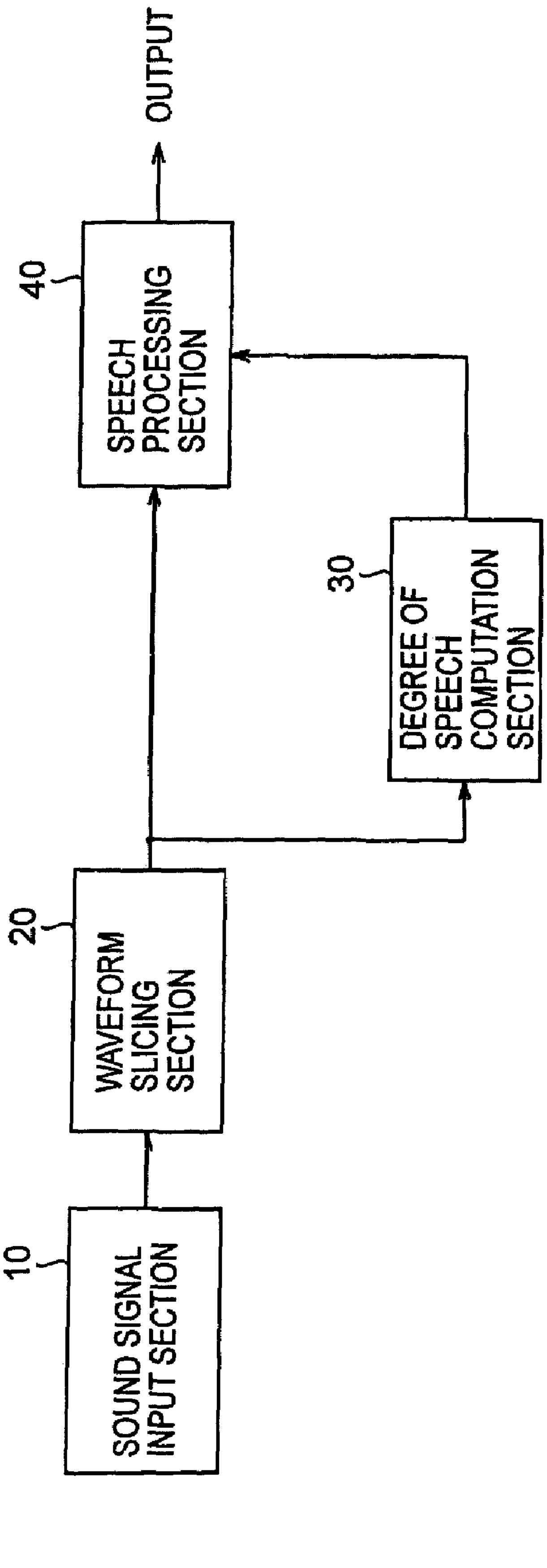
FIG. 1 is a block diagram schematically showing the configuration of a sound signal processing apparatus according to an embodiment of the present invention.

FIG. 1 is a block diagram schematically showing an example of the configuration of a sound signal processing apparatus having a speech separation function according to an embodiment of the present invention.

The sound signal processing apparatus shown in FIG. 1 includes a sound signal input section 10 to which a sound signal that is acoustoelectrically converted by a microphone, a sound signal played back from a recording medium, etc., is input; a waveform slicing section 20 for slicing an input sound signal in units of a predetermined time length (frame); a degree of speech computation section 30 for computing a degree of which the sliced waveform is speech (or more generally vocally-generated audio); and a speech processing section 40 for processing an input sound signal on the basis of the value output from the degree of speech computation section 30. The speech processing section 40, for example, mainly, performs processing for separating speech and ambient sound (noise, such as ambient noise and background noise) of the input sound signal and for attenuating ambient sound and accentuating speech.

The degree of speech computation section 30 of FIG. 1 computes the degree of speech on the basis of the features of the waveform of the input sound signal in the waveform direction. As shown in, for example, FIG. 2, the degree of speech computation section 30 includes a half-wavelength increase and decrease repetition rate computation section 31 for computing a rate at which a length of a half wavelength (or half a cycle, +/− a predetermined amount such as 10%, 3%, 1%, or substantially exactly) between extreme values (max and min for that half wavelength) repeatedly increases or decreases with respect to the waveform for each sliced frame; a zero-cross rate computation section 32 for computing the zero-crossing rate among the half wavelengths contained in the sliced waveform; and a degree of speech output section 33 for calculating and outputting a degree of speech from the two rates obtained from the half-wavelength increase and decrease repetition rate computation section 31 and the zero-cross rate computation section 32.

Figure 2:
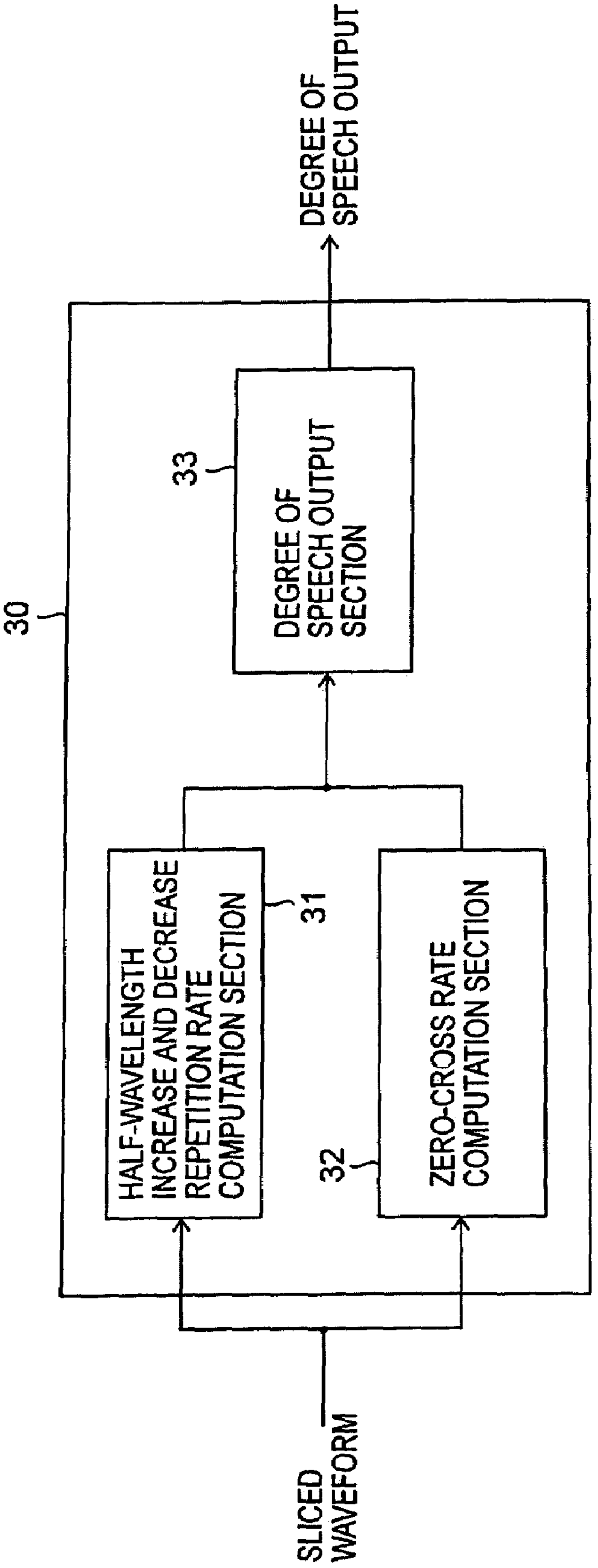
FIG. 2 is a block diagram showing an example of the configuration of a degree of speech computation section used in the embodiment of the present invention.

Next, a description is given of the operation of each section in the configuration shown in FIGS. 1 and 2 in accordance with the processing procedure.

First, the sound signal input section 10 shown in FIG. 1 receives a sound signal. This input sound signal can be any signal. Examples thereof include a sound signal picked up by a microphone, a sound signal obtained by receiving a television broadcast, a radio broadcast, etc., and a sound signal obtained by playing back a recording medium, such as a CD, a DVD, a cassette tape, a video tape, and a semiconductor memory card. The sound signal from the sound signal input section 10 is, for example, a digital signal so as to be compliant with digital processing at a circuit section at a subsequent stage.

Next, the waveform slicing section 20 slices the sound signal into a particular length. Here, the sliced period is called a "frame". The frame length is, for example, 1000 sample points. However, the frame length is not limited to this number of samples and also needs not to be fixed. Furthermore, portions of the previous and subsequent frames may overlap with each other. Regarding the number of cycles, preferably 2 cycles are minimally effective for detecting signal features, such as the pitch of a target speech. When using half-wavelength processing according to the present invention at least 3 wavelengths (cycles) are preferred so as to reliably separate vocally generated sound from mixed sound signals.

Figure 3:
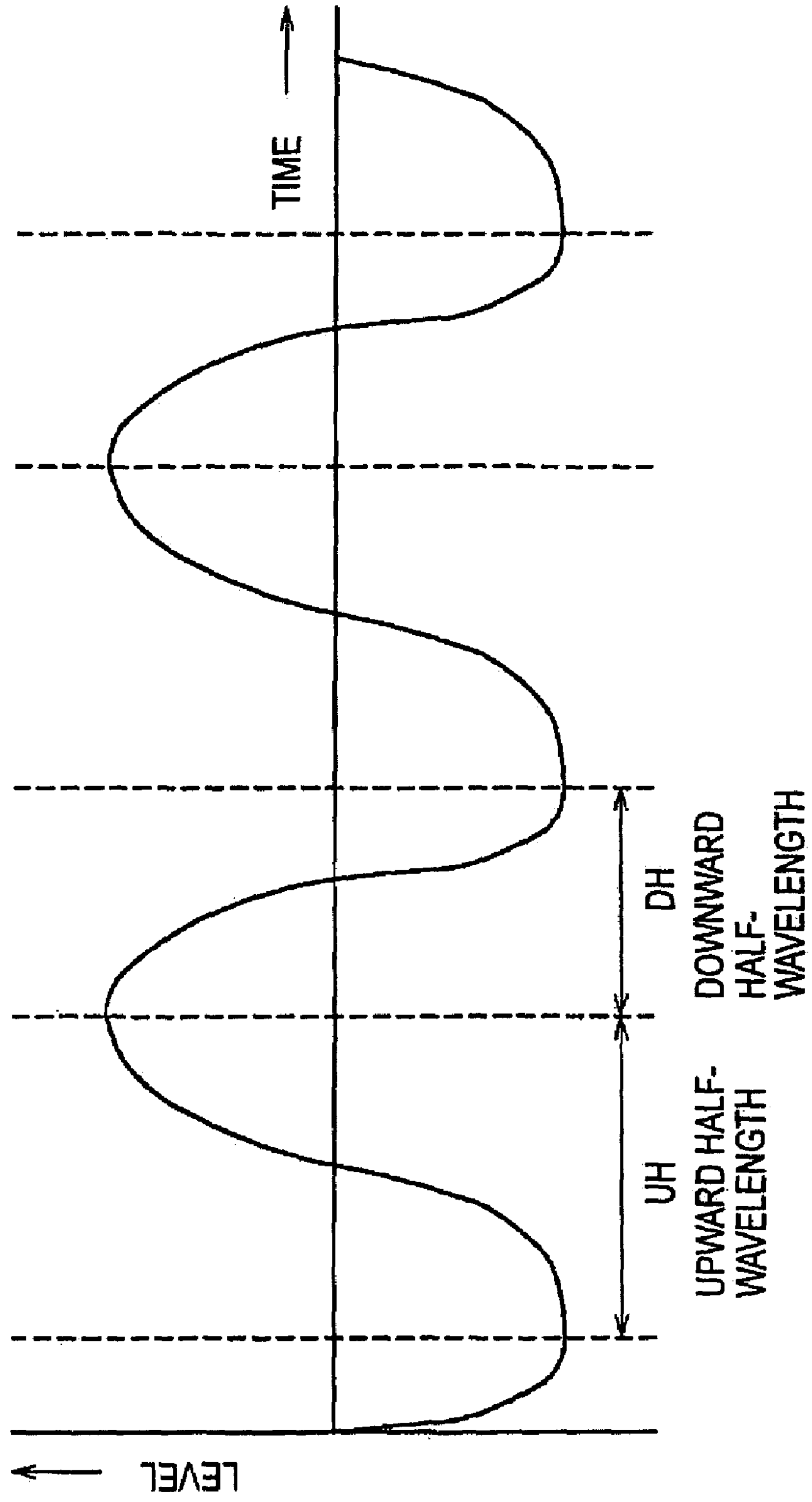
FIG. 3 is a wave chart showing an example of a waveform of a sound signal.

The degree of speech of the sound signal of the frame sliced by the waveform slicing section 20 is determined by the degree of speech computation section 30. The degree of speech computation section 30 has a configuration shown in, for example, FIG. 2, and performs processing for each frame for each half wavelength between the extreme values, as shown in FIG. 3. In FIG. 3, the period from the relative minimum to the relative maximum is denoted as an upward half-wavelength UH, and the period from the relative maximum to the relative minimum is denoted as a downward half-wavelength DH.

In the half-wavelength increase and decrease repetition rate computation section 31 of FIG. 2, by viewing only the upward half-wavelength UH in the frame or only the downward half-wavelength in the frame, the rate at which the changes of the length of the half wavelength repeatedly increase or decrease alternately is computed. That is, it is checked whether the length (in time) of the n-th upward half-wavelength UHn of current interest is increased or decreased in comparison with the length of the preceding (n−1)th upward half-wavelength UHn−1. The rate at which this increase and decrease is alternate as "increase, decrease, increase, and decrease" in the frame is determined. With respect to the downward half-wavelength, similarly, the rate at which this increase and decrease is alternate as "increase, decrease, increase, and decrease" is determined. Based on the two rates, the half-wavelength increase and decrease repetition rate in the frame is determined.

Figure 4:
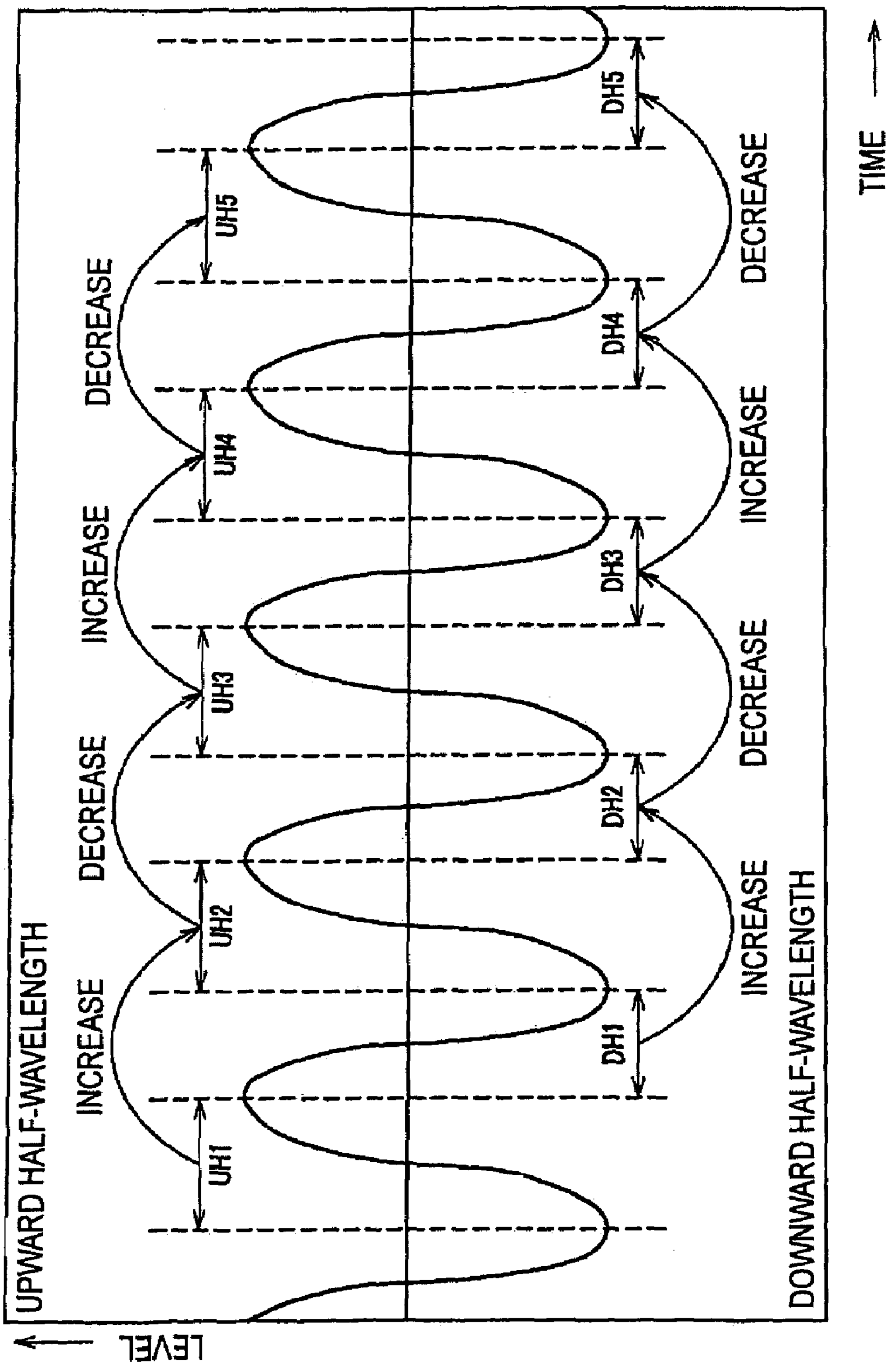
FIG. 4 is a wave chart showing an example of a sound signal waveform for the purpose of illustrating an increase and decrease of a half wavelength.

For example, in FIG. 4, with respect to each length of the upward half-wavelength UH, UH2 is increased more than UH1, UH3 is decreased more than UH2, UH4 is increased more than UH3, and UH5 is decreased more than UH4. With respect to each length of the downward half-wavelength DH, DH2 is increased more than DH1, DH3 is decreased more than DH2, DH4 is increased more than DH3, and UH5 is decreased more than UH4. The half-wavelength increase and decrease repetition rate computation section 31 determines the rate of the portions where such increase and decrease repeatedly occur alternately in the frame is determined for the upward half-wavelength UH and the downward half-wavelength DH, determines the half-wavelength increase and decrease repetition rate in the frame on the basis of the average, the product, the weighted average, etc., of the two rates, and sends the rate to the degree of speech output section 33. A more specific configuration and operation of the half-wavelength increase and decrease repetition rate computation section 31 will be described later with reference to the drawings.

Figure 5:
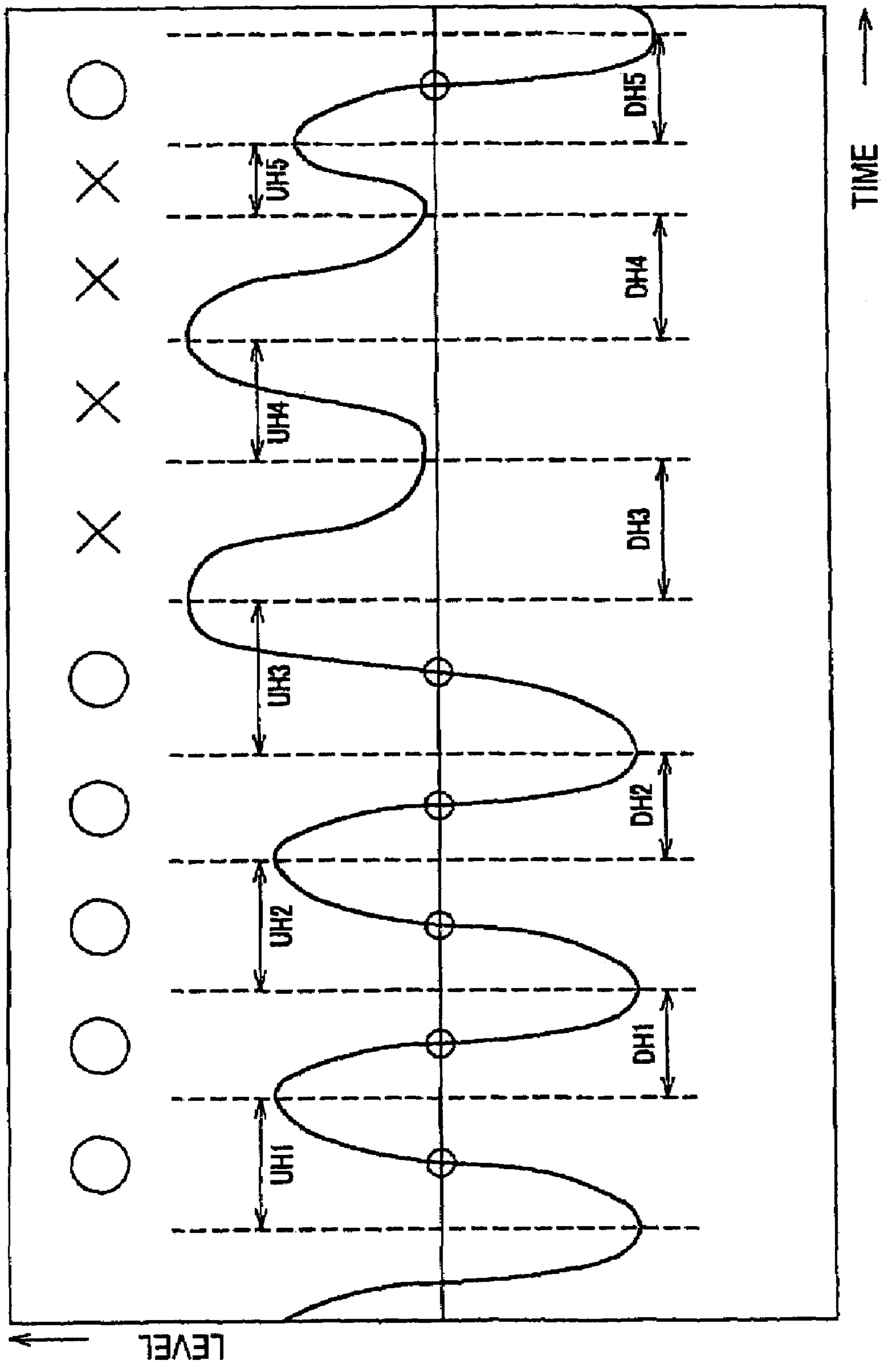
FIG. 5 is a wave chart showing an example of a sound signal waveform for the purpose of illustrating the zero cross of a half wavelength.

In the zero-cross rate computation section 32 of FIG. 2, the rate of the half wavelength having a zero cross within the half wavelength in the frame is determined. For example, in FIG. 5, each of the upward and downward half wavelengths UH1, DH1, UH2, DH2, UH3, and DH5 has a zero cross, and DH3, UH4, DH4, UH5 do not have a zero cross. In the case of FIG. 5, the rate itself of the half wavelengths (6) having a zero cross within 10 half wavelengths is determined as 6/10=0.6. This is performed on all the half wavelengths in the frame, and as will be described later, output adjustments are performed as necessary so as to determine the rate of the half wavelengths having a zero cross within the half wavelength in the frame. The rate is sent to the degree of speech output section 33.

In the degree of speech output section 33 of FIG. 2, the degree of speech is determined on the basis of the rate from the half-wavelength increase and decrease repetition rate computation section 31 and the rate from the zero-cross rate computation section 32. For example, the average, the product, the weighted sum, etc., of each output are considered. The output (the degree of speech) from the degree of speech output section 33 is sent, as the output from the degree of speech computation section 30 in FIG. 1, to the speech processing section 40.

In the speech processing section 40, a process for separating or accentuating/attenuating speech and background noise using the degree of speech output from the degree of speech computation section 30 is performed on the speech waveform of each frame from the waveform slicing section 20, forming an output waveform. For example, a process for outputting the product with the speech waveform of the frame by using the degree of speech as a magnification may be performed.

Figure 6:
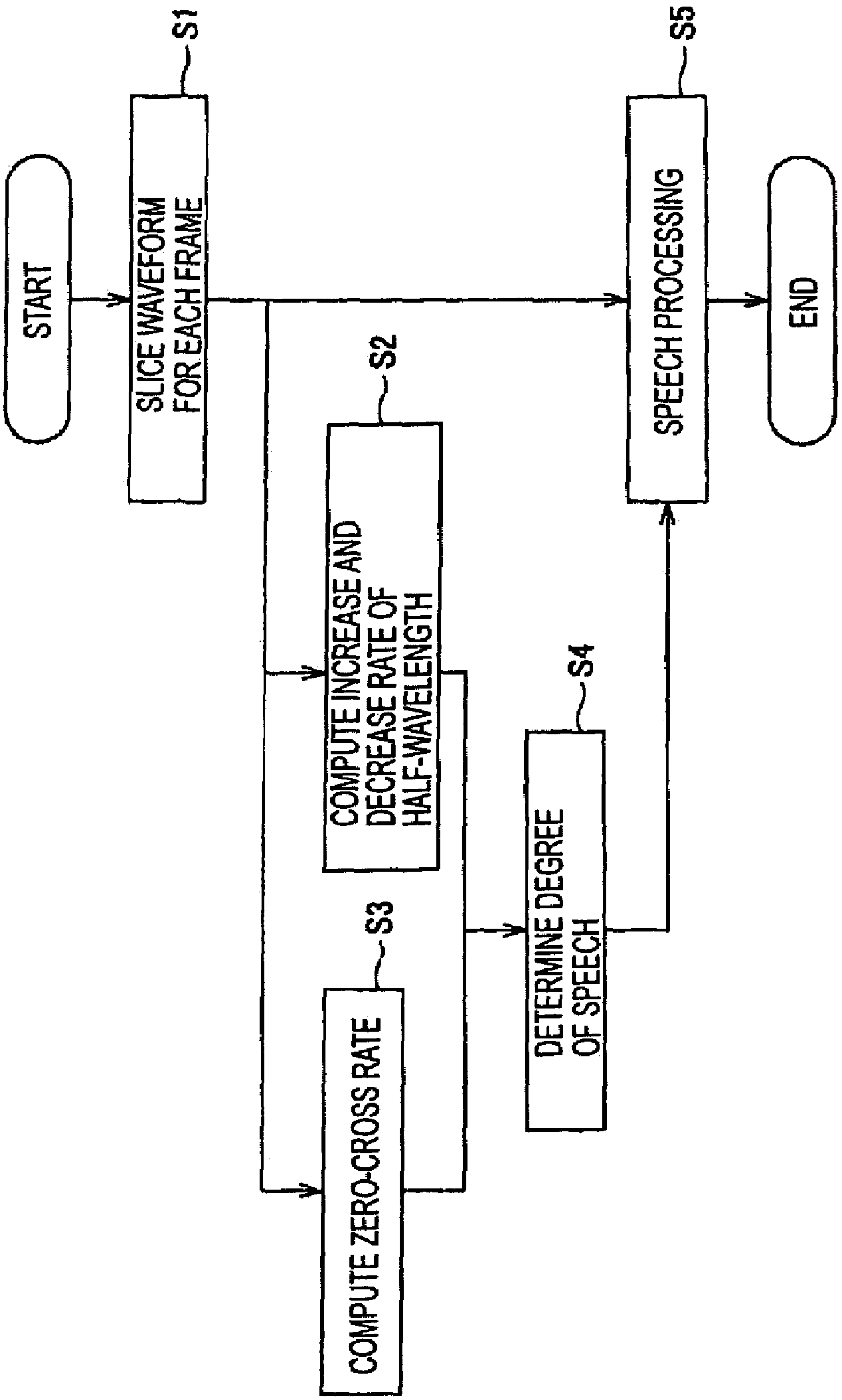
FIG. 6 is an illustration approximated by a flowchart showing the operation of the embodiment of the present invention.

The above procedure, which is approximated by a flowchart, is shown in FIG. 6. In FIG. 6, in step S1, the input sound signal is subjected to a waveform slicing process in frame units. In step S2, the increase and decrease rate of the half wavelength in the frame is computed. In step S3, the rate of the zero cross in the frame is computed. In step S4, the degree of speech is determined using each rate computed in steps S2 and S3 above. In step S5, speech processing for separating or accentuating/attenuating speech and background noise in accordance with the degree of speech obtained in step S4 is performed on the sound signal for each frame sliced in step S1.

The gist of the embodiment of the present invention is such that whether the waveform of the input sound signal is "speech" or "ambient sound (traveling sound of a vehicle, wind sound, noise)" is discriminated. That is, as in the conventional case, in a technique for simply discriminating between speech and ambient sound in accordance with the magnitude of the level, there is a drawback in that even noise with a high level is regarded as speech. Therefore, in the embodiment of the present invention, whether the waveform is "speech" or "ambient sound" at each time is converted into numbers as "speech likeliness". The reason for this is that both ambient sound and speech may be contained, and a determination by a binary value of either of them is difficult. The term "speech likeliness" is used in the implication of the possibility that the waveform in a fixed period is speech or used in the implication of the rate of the speech waveform contained in the waveform.

The technique used in the embodiment of the present invention is specialized for vowel parts. Since the vowel part of speech is composed of a fundamental frequency and harmonic tone components thereof, the wavelength becomes steady. In the embodiment of the present invention, one wavelength is from a relative maximum point to the next relative maximum point or from a relative minimum point to the next relative minimum point. For this reason, in general, if the jitter of the wavelength is to be properly characterized, the length always becomes "always a fixed value→no jitter" or "varied in a fixed range→jitter exists". In the embodiment of the present invention, the "jitter" means fluctuation or amount of changes in the portions where this half wavelength "increases, decreases, increases, and decreases" and also, means changes of the waveform in the level direction on the basis of zero cross (or a deviation of the center point) in an example as a reference for speech likeliness.

More specifically, in the embodiment of the present invention, two types of jitter, that is, "jitter of the wavelength" (amount of increase/decrease changes) and "jitter in the level direction" (amount of zero crossings), are defined. In each case, jitter occurs in the following cases.

Figures 7, 8:
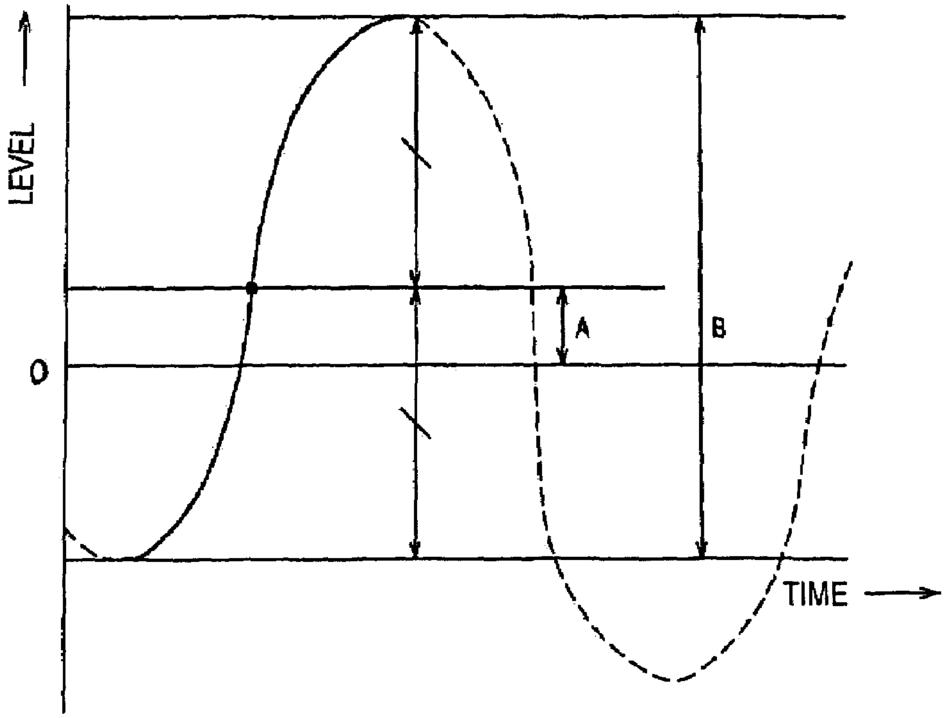
FIG. 7 is a wave chart showing an example of a waveform for the purpose of illustrating the deviation of the center point in the level direction of a half wavelength.
FIG. 8 shows the relationship between jitter (or degree of change) and speech (or vocally-generated sound) likeliness.

First, the phrase "jitter of the wavelength" refers to alternating changes of the length of the upward half-wavelength or the downward half-wavelength, such as "increase, decrease, increase, and decrease". Next, the phrase "jitter in the level direction" refers to a case where the half wavelength does not zero cross. Here, as the "jitter in the level direction", a case in which the center point in the level direction of the half wavelength is away (above or below) from the zero cross by a predetermined amount may be used. In this case, as shown in FIG. 7, as an example, the "jitter in the level direction" is determined by the degree A/B of the deviation from the center point in the amplitude direction of the half wavelength.

In the relationship between each jitter and speech likeliness, regarding the "jitter of the wavelength", the more there is jitter, that is, the more there are the wavelengths where the changes of the length of the half wavelength are "increase, decrease, increase, and decrease", the possibility of being speech is high. Regarding the "jitter in the level direction", the smaller the jitter, that is, the smaller the rate of the half wavelength that does not zero cross or the closer the center point in the level direction of the half wavelength to the zero cross, the possibility of being speech is high. As more specific, although non-limiting examples, the following repetition rates (e.g., increase, decrease, increase) were shown to correspond with the following probability gradations.

about 40% or less—no vocally generated sound (VSG)
about 40% to 60%—low probability of speech/VGS
about 60% to 80%—high probability of speech/VGS
about 80% or more—very high probability of speech/VGS Regarding zero-crossing rate, the following non-limiting examples illustrate the relevant probability gradations.

about 50% or less—no vocally generated sound
about 50% to 70%—low probability of speech/VGS
about 70% to 85%—high probability of speech/VGS
about 85% or more-very high probability of speech/VGS.

This is known to have a harmonic structure of a particular fundamental frequency if the spectrum of the sound signal waveform is obtained. In general, the fundamental frequency corresponds to a pitch indicating the height of sound and is also called a "pitch frequency". For example, a peak appears at a position that is an integral multiple times as high as the pitch frequency. Furthermore, with respect to the pitch period corresponding to adjacent peaks in the sound signal waveform, an actual waveform signal contains components of the wavelength longer than the pitch frequency. In particular, components of the pitch period two times as high appear comparatively dominantly. Such components of the pitch period two times as high correspond to the fact that, when viewed by the upward half-wavelength or the downward half-wavelength, the increase and decrease in the changes of the length repeatedly appears alternately. The more there are the wavelengths such that the changes of the length of the half wavelength are "increase, decrease, increase, and decrease", the possibility of being speech is high. This holds to a certain degree not only in the case of human voice, but also in the case of a so-called musical sound signal containing musical instrument tone. In the embodiment of the present invention, a speech signal containing musical sound and ambient sound (noise) can be separated or accentuated/attenuated.

Figure 9:
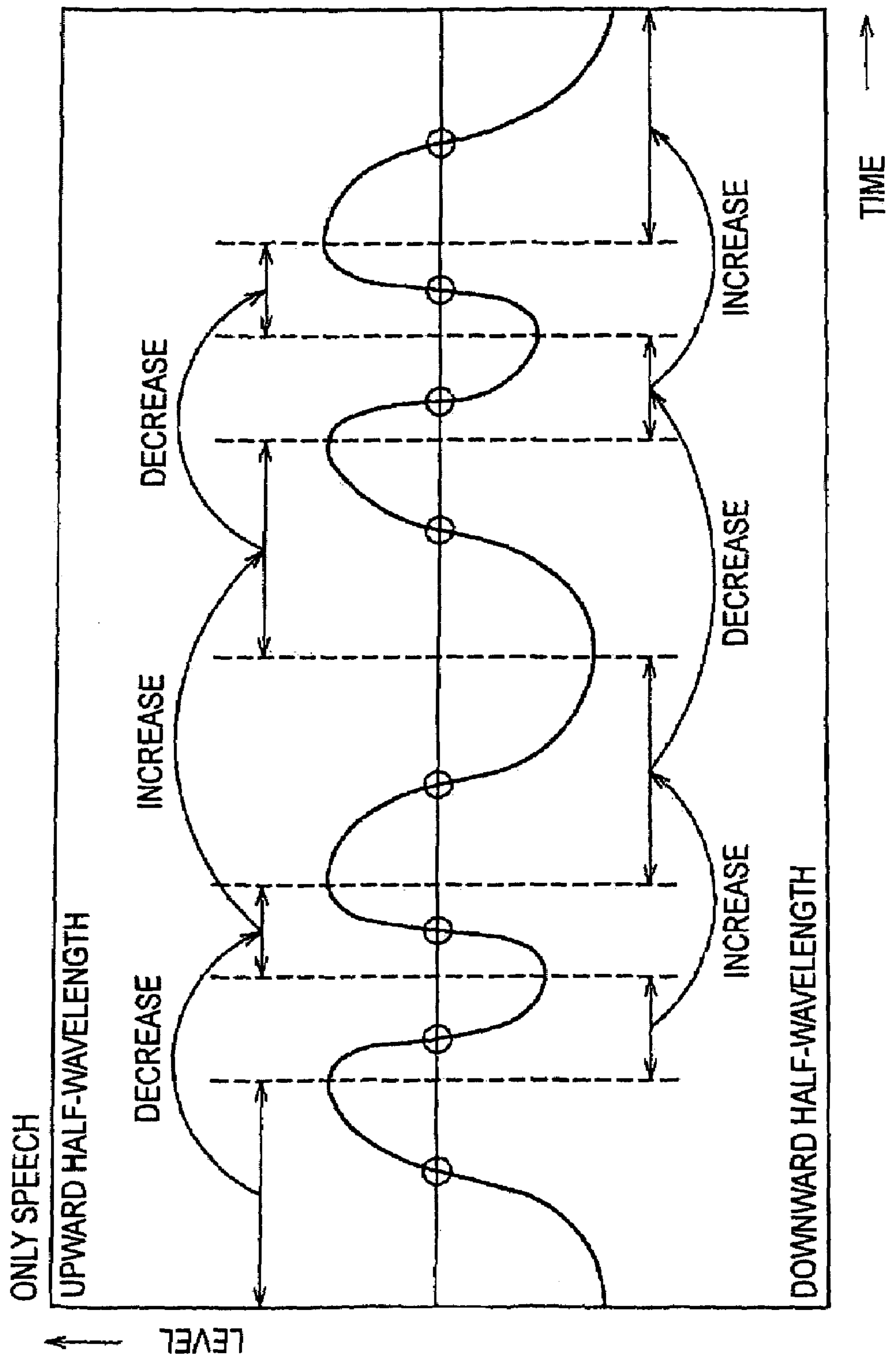
FIG. 9 is a wave chart showing an example of a sound signal waveform in the case of only vocally-generated sound, which in this case is speech.
Figure 10:
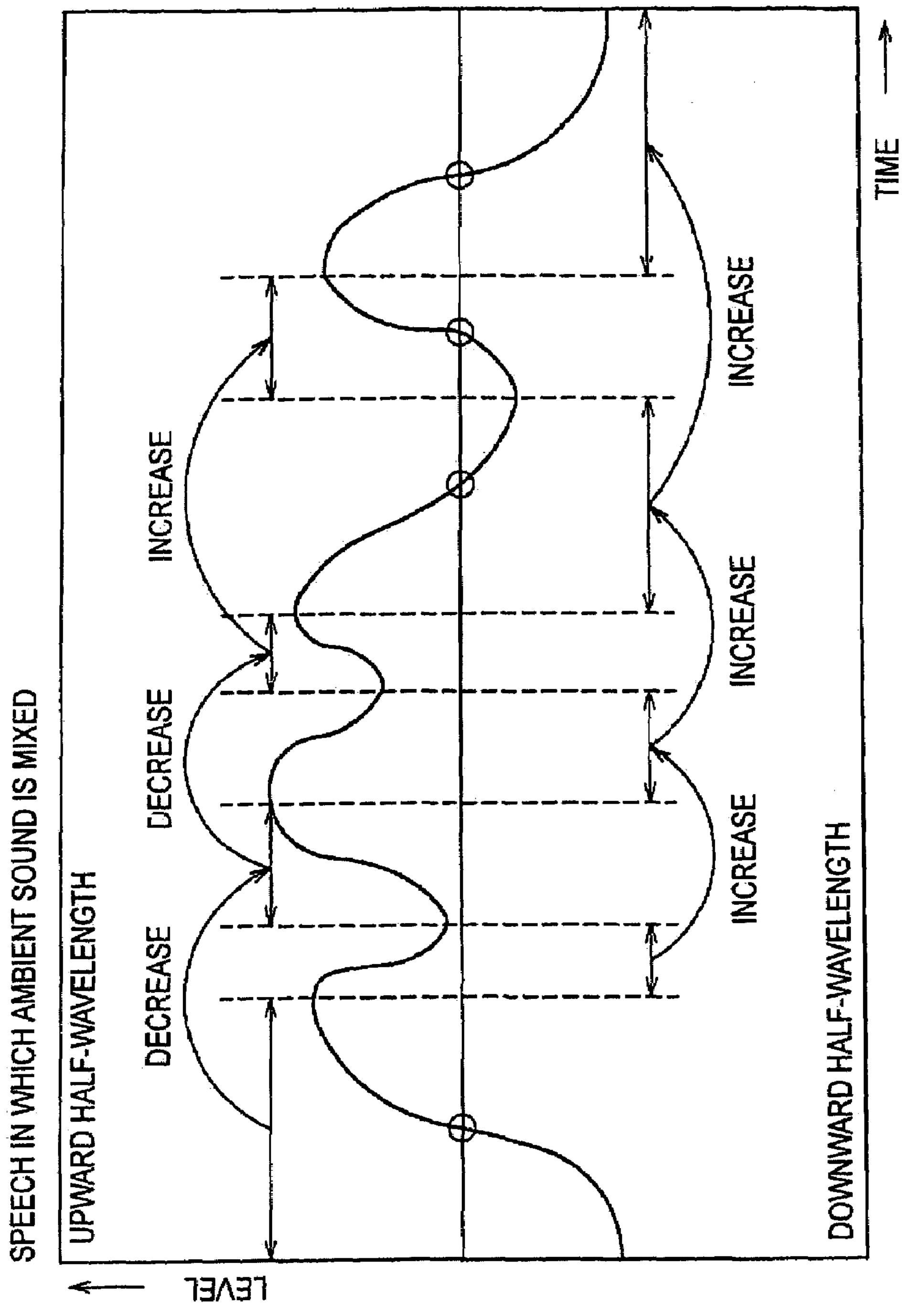
FIG. 10 is a wave chart showing an example of a sound signal waveform in the case of speech in which ambient sound is mixed.

The above-described relationship between jitter and speech likeliness is summarized in FIG. 8, and is further discussed with examples that relate to FIGS. 17 through 21. An example of a waveform when the input sound signal is only speech is shown in FIG. 9. An example of a waveform of a sound signal in which ambient sound is mixed is shown in FIG. 10. An example of a waveform in which there is no jitter of a wavelength is shown in FIG. 11.

As is clear from FIG. 8, where the jitter of the wavelength is large it corresponds to speech, and where the jitter of the wavelength is small, it corresponds to ambient sound. Where the jitter in the level direction is large, it corresponds to ambient sound, and where the jitter in the level direction is small it corresponds to speech.

FIG. 9 shows a case in which the jitter of the wavelength of the waveform of an input sound signal alternately appears as "increase, decrease, increase, and decrease" and only speech exists. FIG. 10 shows a case in which there are many non-zero-crossing parts and the jitter in the level direction is large and shows that the input sound signal is mixed with ambient sound (noise).

Figure 11:
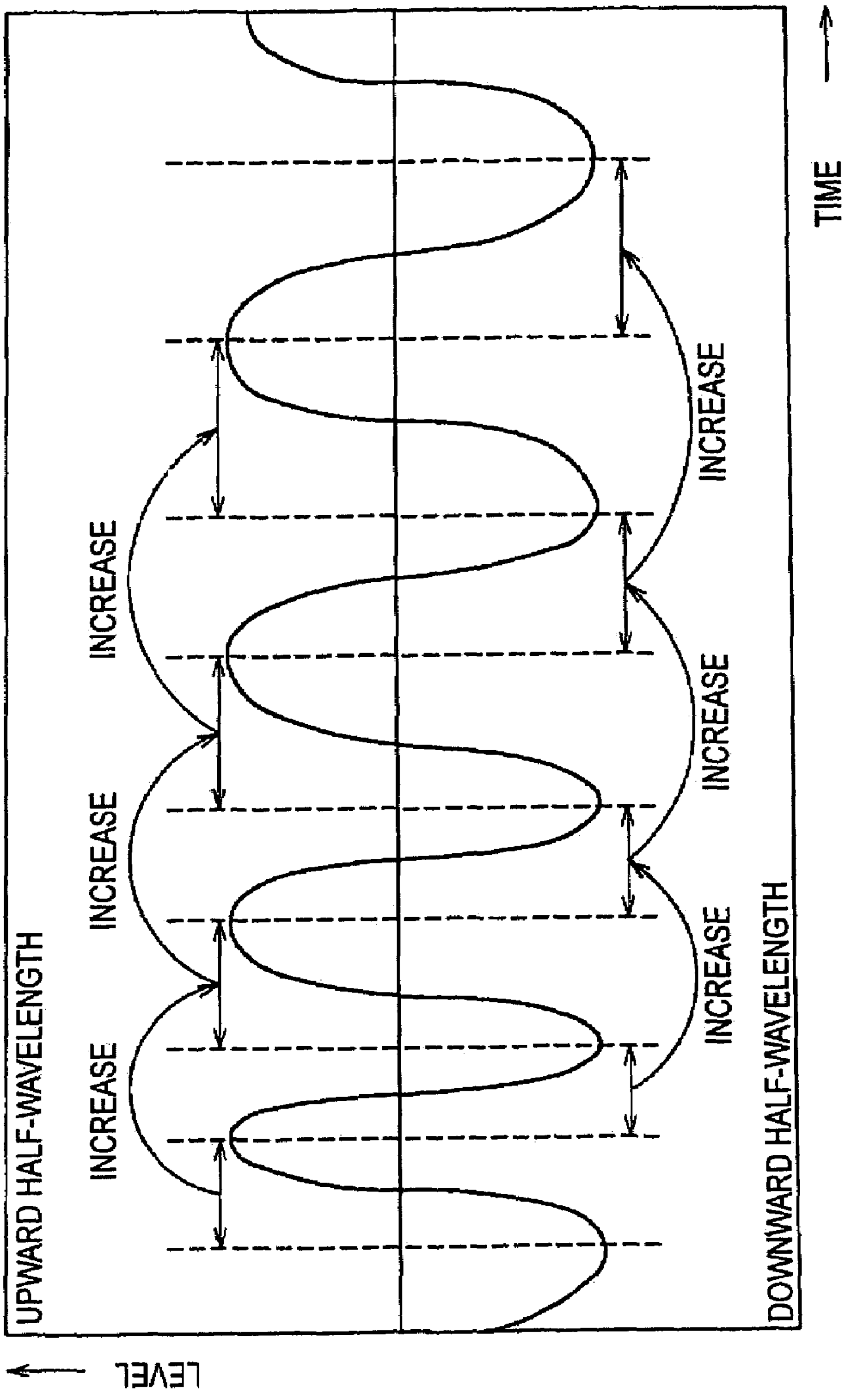
FIG. 11 is a wave chart showing an example of a sound signal waveform when there is no jitter of a waveform.

FIG. 11 shows an example of a waveform in which the half wavelength increases only and there is no jitter of the wavelength, and therefore, the possibility of speech/VGS is very low.

Next, a description is given, with reference to the drawings, of a more specific example of the configuration for half-wavelength increase and decrease repetition rate computation and zero-cross rate computation for the purpose of determining speech likeliness or a degree of speech.

Figure 12:
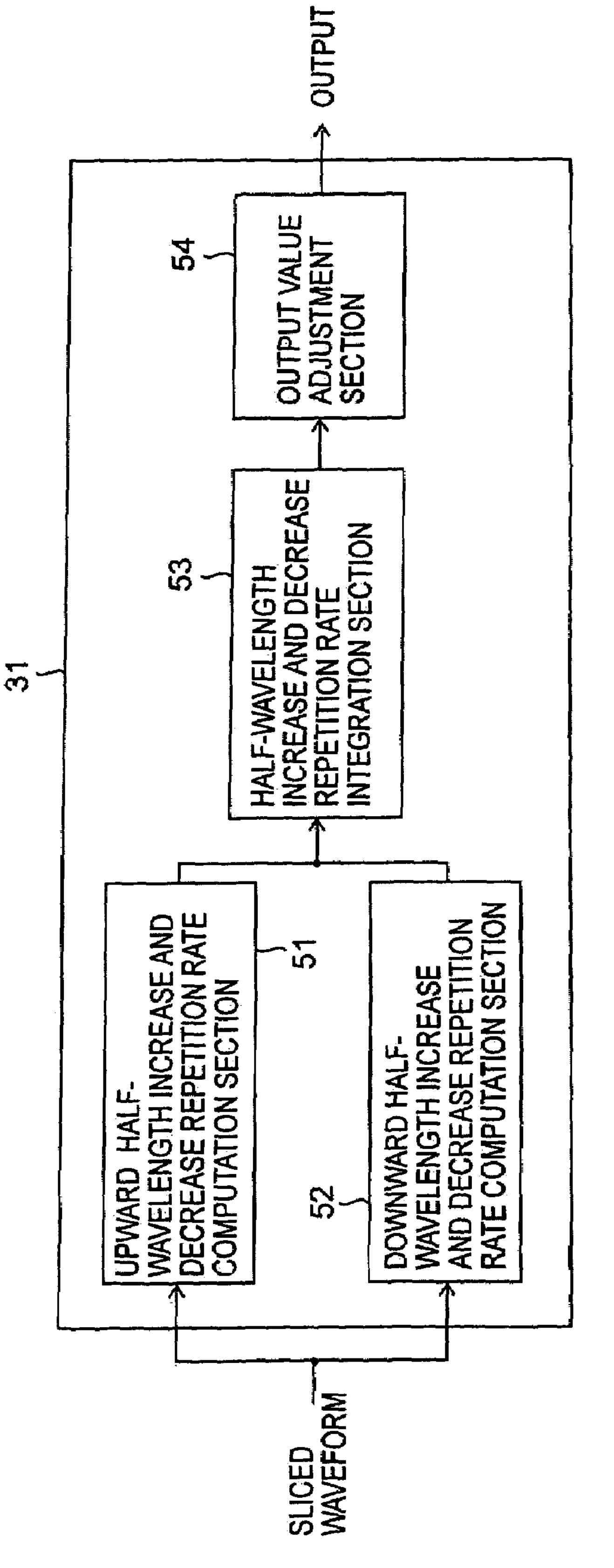
FIG. 12 is a block diagram showing an example of the configuration of a half-wavelength increase and decrease repetition rate computation section used in an embodiment of the present invention.
Figure 13:
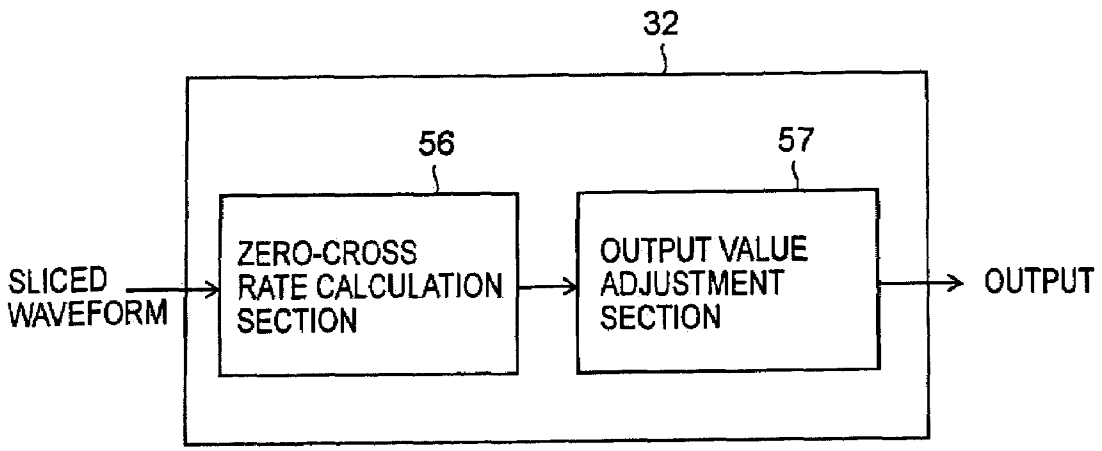
FIG. 13 is a block diagram showing an example of the configuration of a zero-cross rate calculation section used according to an embodiment of the present invention.

FIG. 12 is a block diagram showing a specific example of the configuration of the half-wavelength increase and decrease repetition rate computation section 31 of FIG. 2. FIG. 13 is a block diagram showing a specific example of the configuration of the zero-cross rate calculation section 32 of FIG. 2.

The half-wavelength increase and decrease repetition rate computation section 31 shown in FIG. 12 includes an upward half-wavelength increase and decrease repetition rate computation section 51, a downward half-wavelength increase and decrease repetition rate computation section 52, the waveform of a sound signal sliced in frame units in the waveform slicing section 20 of FIG. 1 being input to the sections 51 and 52, a half-wavelength increase and decrease repetition rate integration section 53 for integrating the rates output from the upward half-wavelength increase and decrease repetition rate computation section 51 and the downward half-wavelength increase and decrease repetition rate computation section 52, and an output value adjustment section 54 for adjusting and outputting the output value from the half-wavelength increase and decrease repetition rate integration section 53. The output from the output value adjustment section 54 is sent to the degree of speech output section 33. The output value adjustment section 54 may be omitted.

Figure 14:
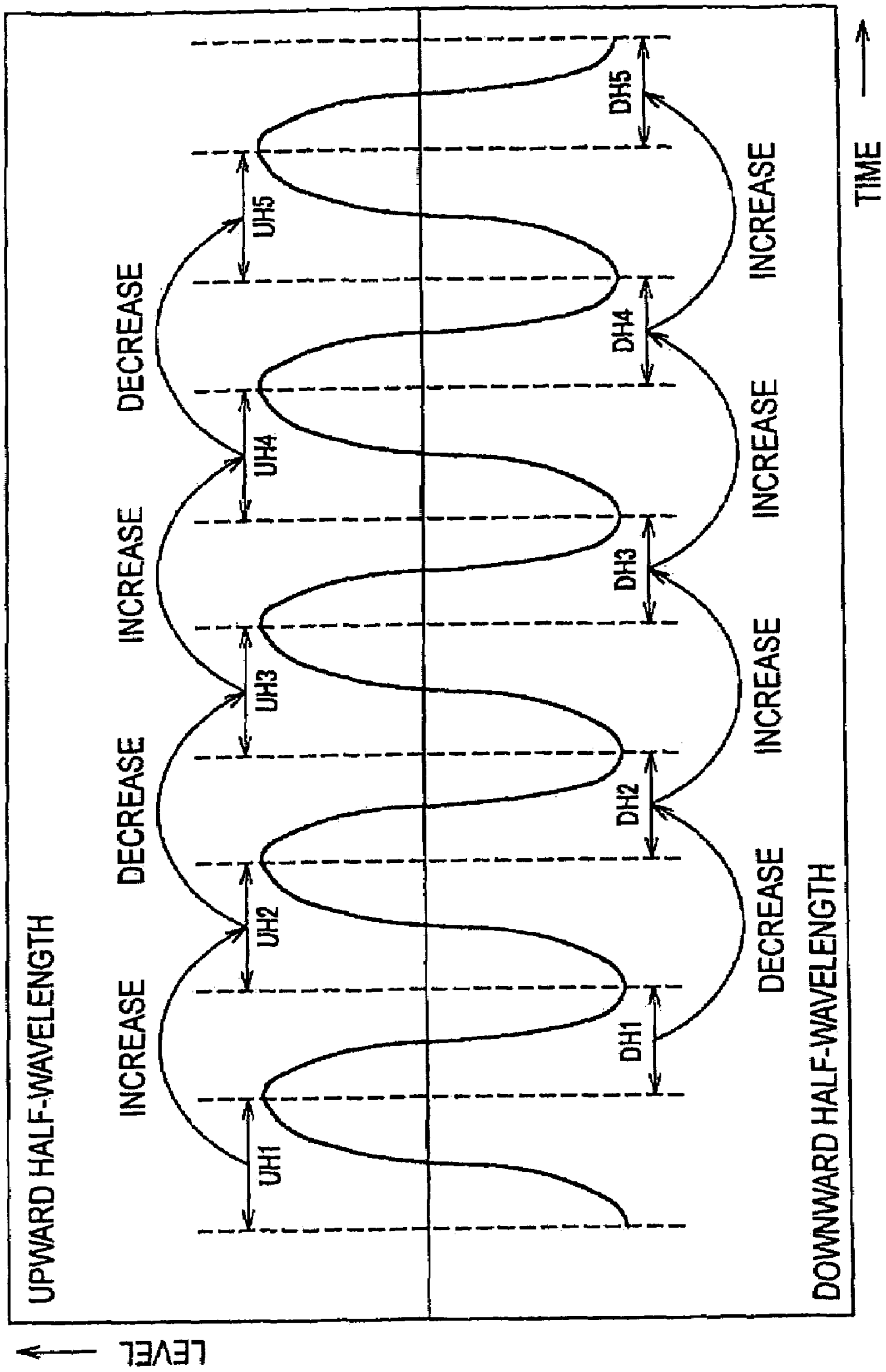
FIG. 14 is a wave chart showing an example of a sound signal waveform for the purpose of illustrating the increase and decrease repetition rate of an upward half-wavelength and a downward half-wavelength.

Next, a description is given, with reference to FIG. 14, of the operation of the upward half-wavelength increase and decrease repetition rate computation section 51 and the downward half-wavelength increase and decrease repetition rate computation section 52 of FIG. 12. In this case, identical processing is performed for the upward half-wavelength and the downward half-wavelength.

In the upward half-wavelength increase and decrease repetition rate computation section 51, first, the number of sets in which the changes of the length of three adjacent half wavelengths in the frame are alternate as "increase and decrease" or "decrease and increase" is denoted as Aup. When the number of all the upward half-wavelengths in the frame is denoted as Nup, the upward half-wavelength increase and decrease repetition rate Rup is defined by Rup=Aup/(Nup−2). With respect to the downward half-wavelength of the downward half-wavelength increase and decrease repetition rate computation section 52, Rdown is defined by Rdown=Adown/(Ndown−2).

In the example of FIG. 14, UH2 is increased more than UH1 of the upward half-wavelength, UH3 is decreased more than UH2, and UH4 is decreased more than UH3. DH2 is decreased more than the downward half-wavelength DH1, DH3 is increased more than DH2, DH4 is increased more than DH3, and DH5 is increased more than DH4. That is, the set of UH1 to UH3 is "increase and decrease", the set of UH2 to UH4 is "decrease and increase", the set of the UH3 to UH5 is "increase and decrease", and the set of UH1 to UH3 is "decrease and increase". Therefore, in the example of FIG. 14, Rup and Rdown are calculated as follows:

$$Rup=Aup/(Nup-2)=2/(5-2)=0.67$$

$$Rdown=Adown/(Ndown-2)=1/(5-2)=0.33.$$

The upward and downward half-wavelength increase and decrease repetition rates Rup and Rdown determined by the upward half-wavelength increase and decrease repetition rate computation section 51 and the downward half-wavelength increase and decrease repetition rate computation section 52, respectively, in the above-described manner are sent to the half-wavelength increase and decrease repetition rate integration section 53, whereby they are integrated. In an example of this integration method, the product, the average, the larger value, and the smaller value of Rup and Rdown are determined. The output from the half-wavelength increase and decrease repetition rate integration section 53 is sent to the output value adjustment section 54 for adjusting a value range. For example, the output value is changed to the range from 0.0 to 1.0 and is output. In an example of this processing, when an input to the output value adjustment section 54 is denoted as "in", and an output from the output value adjustment section 54 is denoted as "out", the following holds:

$$out = \begin{cases} 0 & \text{if } (in < TH) \\ (in - TH)/(1.0 - TH) & \text{else} \end{cases} \quad (1)$$

where TH is a threshold value greater than or equal to 0 and less than 1 (0≦TH<1.0). Since the expected value of the rate at which "increase and decrease" becomes alternate is 0.5, TH is preferably a value greater than that value. The output value adjustment section 54 may be omitted.

As a calculation method in the upward half-wavelength increase and decrease repetition rate computation section 51 and the downward half-wavelength increase and decrease repetition rate computation section 52, in addition to the above-described method for counting the cases where the changes of the length of three half wavelengths in the sliced frame are "increase and decrease" or "decrease and increase", various methods may be used. Example thereof include a method for determining the maximum value of the length in which "increase and decrease" or "decrease and increase" continues alternately, and the method for determining variations of the length in which "increase and decrease" or "decrease and increase" continues alternately. These methods are described below with reference to FIG. 15. In the example of the waveform of FIG. 15, the number of lengths in which "increase and decrease" or "decrease and increase" continues alternately with respect to the upward half-wavelengths is "3" in a portion "a", is "2" in a portion "b", and is "2" in a portion c, and the number with respect to the downward half-wavelengths is "1" in a portion d, is "4" in a portion e, and is "1" in a portion f.

The method for determining the maximum value of the lengths in which "increase and decrease" or "decrease and increase" continues alternately is such that the maximum value of the number of the lengths in which "increase and decrease" or "decrease and increase" continues alternately is determined for each upward half-wavelength and for each downward half-wavelength in the sliced frame. For example, in the example of the waveform of FIG. 15, the number of lengths in which "increase and decrease" continues alternately is "3" for the upward half-wavelength and is "4" for the downward half-wavelength.

As an example of the method for determining variations of the lengths in which "increase and decrease" or "decrease and increase" continues alternately, if variations to be determined for the upward half-wavelength and the downward half-wavelength are denoted as Vup and Vdown, respectively, these are defined by the following equations.

$$Vup=(Aveup/Varup)/(Nup-2)$$

$$Vdown=(Avedown/Vardown)/(Ndown-2)$$

where Aveup and Avedown are the average values of the lengths of the increase and decrease repetition for the upward and downward half-wavelengths, respectively, Var is a variance of the lengths of the increase and decrease repetition, and Nup and Ndown are the numbers of the upward and downward half-wavelengths, respectively.

Figure 15:
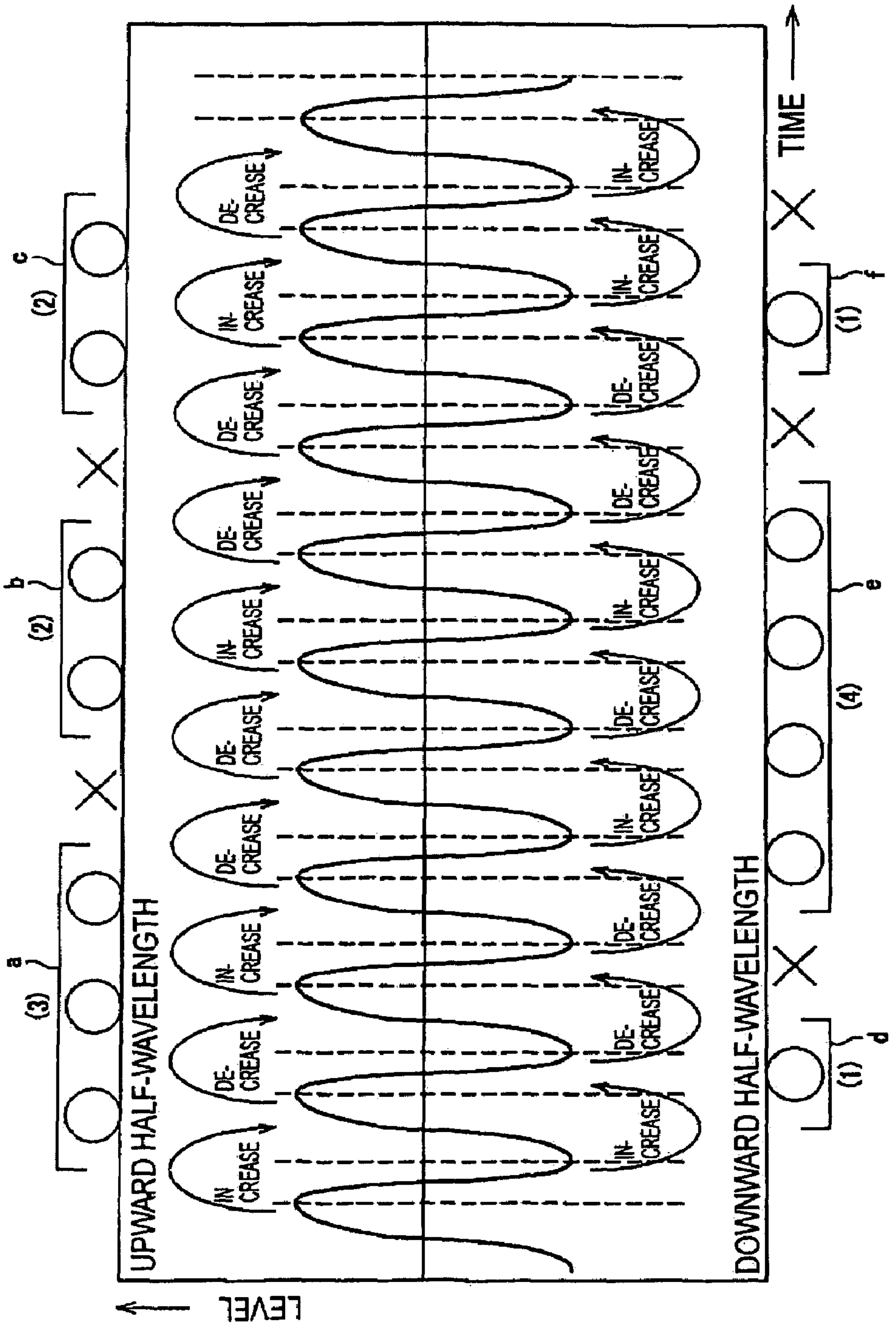
FIG. 15 is a wave chart showing an example of a sound signal waveform for the purpose of illustrating another method for calculating the increase and decrease repetition rate of an upward half-wavelength and a downward half-wavelength.

In the case of FIG. 15, Vup and Vdown are calculated as follows.

$$Vup=(2.33/0.22)/(9-2)=1.5$$

$$Vdown=(2/2)/(9-2)=0.14$$

However, if these are kept as is, the output value does not fall within the range of 0 to 1. Therefore, Vup and Vdown need to be adjusted by the output value adjustment section 54. More specifically, a sigmoid function shown in equation (2) below is used as an example.

$$out = \frac{1}{1 + e^{-in/\alpha}} \tag{2}$$

where "in" is an input to the output value adjustment section 54, "out" is an output from the output value adjustment section 54, and a is a parameter.

Next, the zero-cross rate computation section 32 shown in FIG. 13 includes a zero-cross rate calculation section 56 to which the waveform of a sound signal sliced in frame units by the waveform slicing section 20 of FIG. 1 is input, and an output value adjustment section 57 for adjusting and outputting the output value from the zero-cross rate calculation section 56. The output from the output value adjustment section 57 is sent, as the output of the zero-cross rate computation section 32, to the degree of speech output section 33 of FIG. 2. The output value adjustment section 57 may be omitted.

In the zero-cross rate computation section 32, as a zero-cross rate, (the number of half wavelengths having a zero cross)/(the number of all the half wavelengths) is determined, and this is sent, as a zero-cross rate output value, to the output value adjustment section 57. For example, in the example of the waveform in FIG. 5, the upward and downward half-wavelengths UH1, DH1, UH2, DH2, UH3, and DH5 have a zero cross, and DH3, UH4, DH4, and UHS do not have a zero cross. Therefore, (the number of half wavelengths having a zero cross)/(the number of all the half wavelengths) is calculated as 6/10=0.6. This is calculated for all the half wavelengths in the frame.

In the output value adjustment section 57, the output value of the zero-cross rate determined by the zero-cross rate calculation section 56 by performing the above calculation is adjusted to the range of, for example, 0.0 to 1.0 and is output. In an example of this processing, similarly to the output value adjustment section 54, the calculation of equation (1) or equation (2) is performed. In equations (1) and (2), "in" is an input to the output value adjustment section 57, "out" is an output from the output value adjustment section 57, and a of equation (2) is a parameter.

Next, a description will be given, with reference to FIGS. 16 to 20, of an output waveform or an output value from each section in the configuration shown in FIGS. 1, 2, 12, and 13 with respect to a specific example of a waveform of a sound signal.

Figure 16:
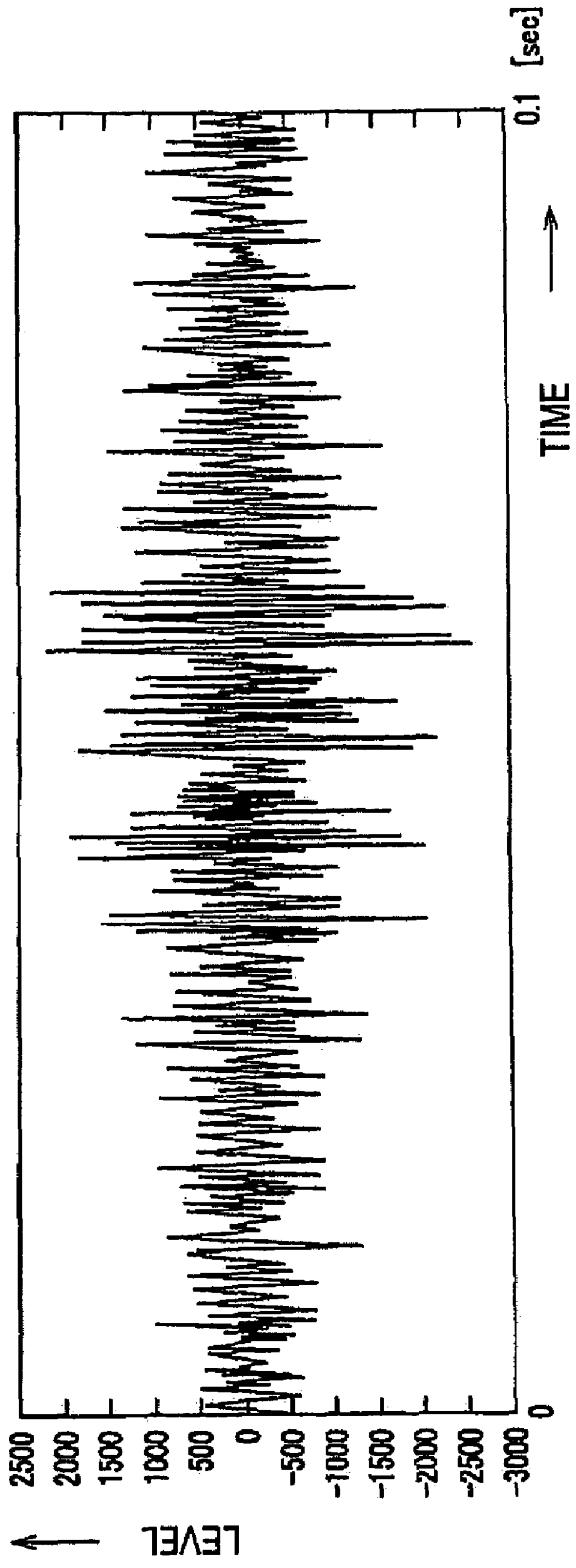
FIG. 16 is a wave chart showing an example of a waveform of an input sound signal.

FIG. 16 shows a waveform of the frequency band of 800 to 2000 Hz, which is extracted from an input sound signal by a filter. The unit of the x axis in FIG. 16 is [sec]. The output value from each section with respect to the waveform of the sound signal shown in FIG. 16 is shown in FIGS. 17 to 20. FIGS. 17 to 20 show the output values obtained by setting the frame length as 1000 samples (approximately 21 msec) and by shifting the frames every 100 samples (approximately 2.1 msec).

Figure 17:
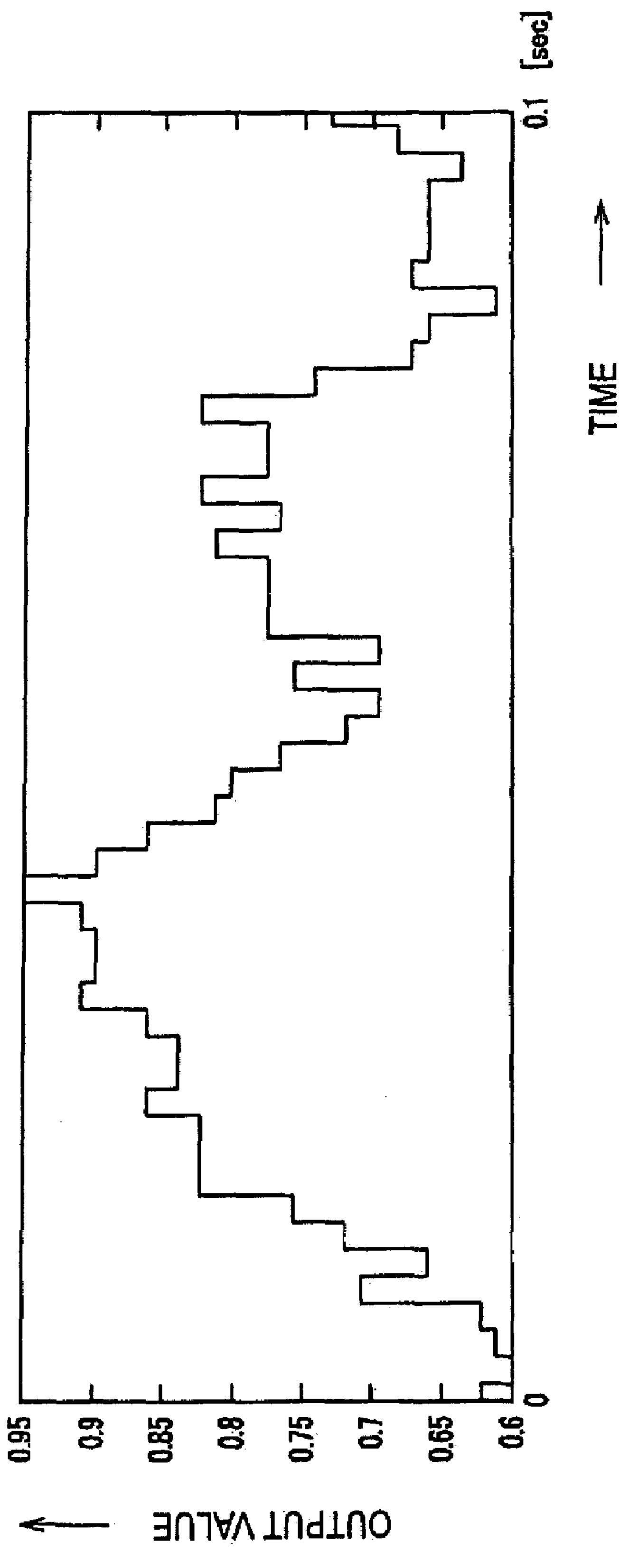
FIG. 17 shows an output value, which is an upward half-wavelength repetition rate computation result.
Figure 18:
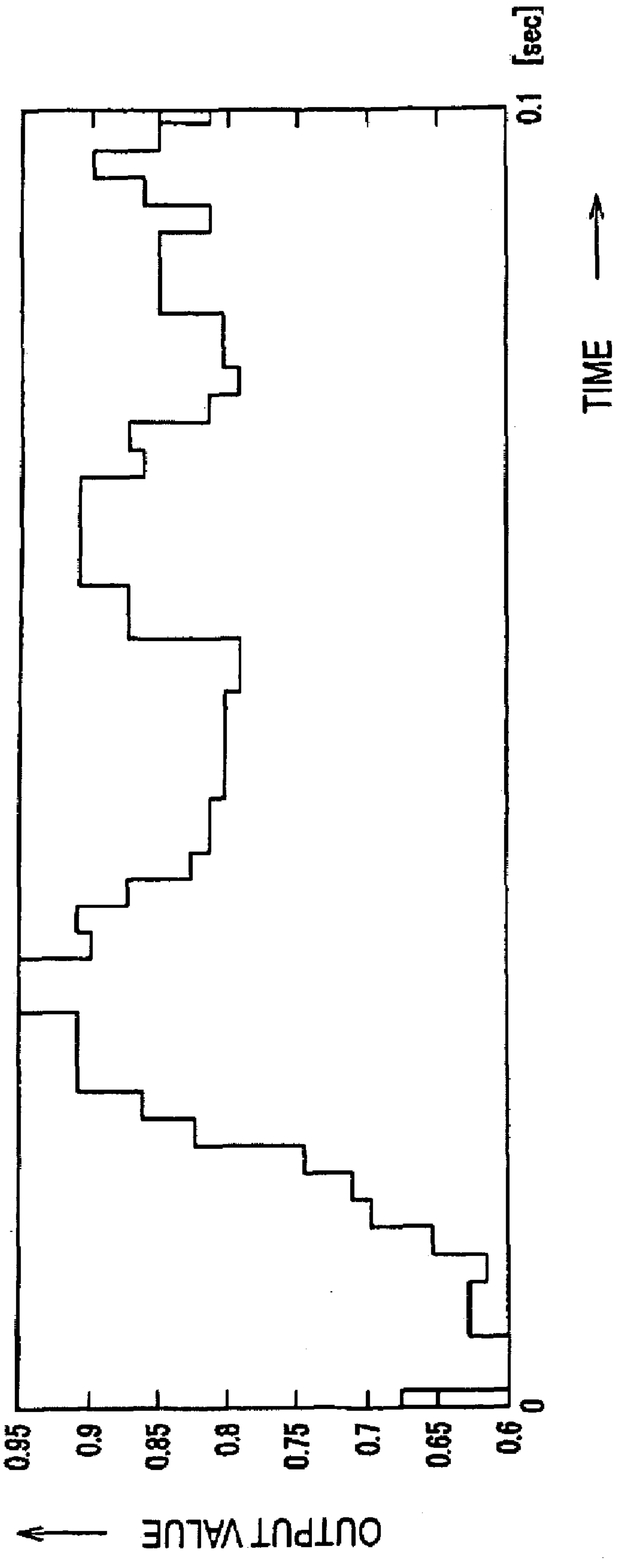
FIG. 18 shows an output value, which is a downward half-wavelength repetition rate computation result.
Figure 19:
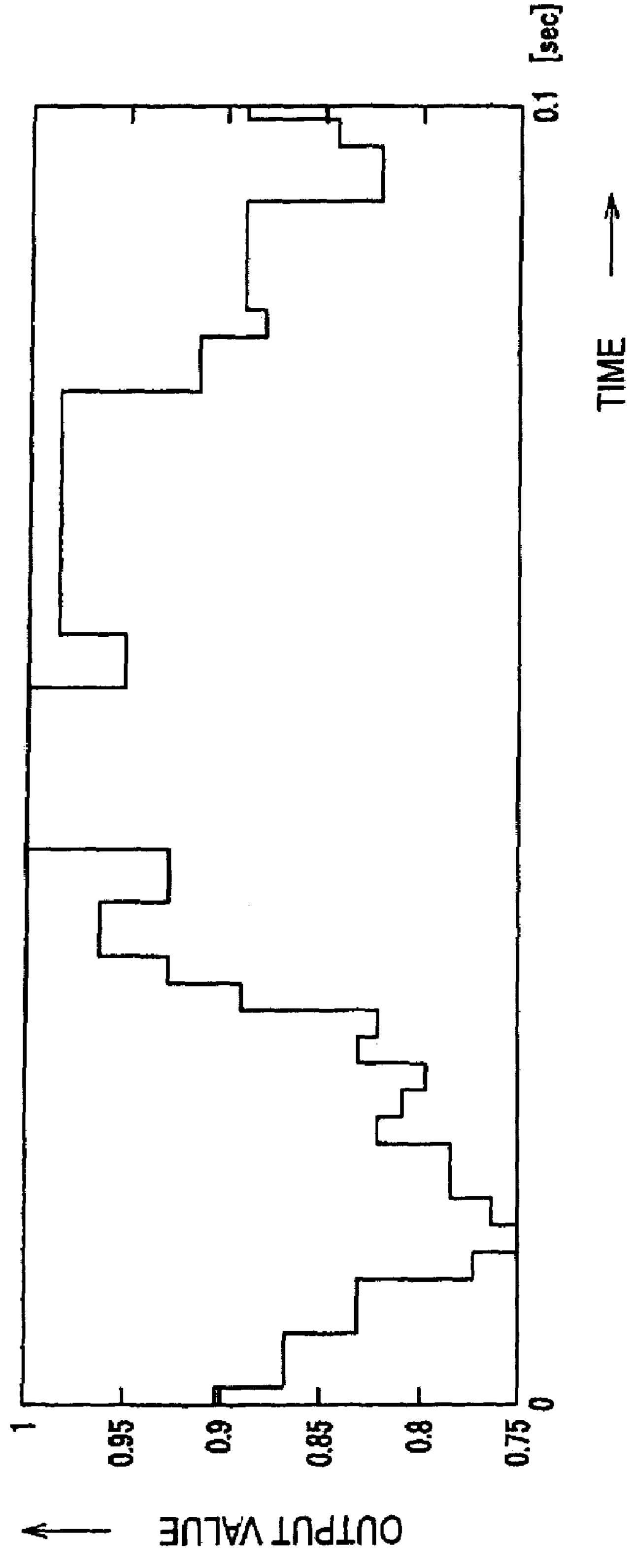
FIG. 19 shows an output value, which is a zero-cross rate computation result.

FIG. 17 shows an output result (output value) of the upward half-wavelength increase and decrease repetition rate determined by the upward half-wavelength increase and decrease repetition rate computation section 51 of FIG. 12. FIG. 18 shows an output result (output value) of the downward half-wavelength increase and decrease repetition rate determined by the downward half-wavelength increase and decrease repetition rate computation section 52 of FIG. 12. FIG. 19 shows an output result (output value) of the zero-cross rate determined by the zero-cross rate calculation section 56 of FIG. 13. In the specific examples of FIGS. 17 and 18, in the upward half-wavelength increase and decrease repetition rate computation section 51 and the downward half-wavelength increase and decrease repetition rate computation section 52, the result is shown in which, for example, the number of portions where the changes of the lengths of three half wavelengths in the sliced frame are "increase and decrease" or "decrease and increase" are counted, and the rate thereof is computed. In addition, as described above, the maximum value of the number of lengths in which "increase and decrease" or "decrease and increase" continues alternately may be determined, or variations of the lengths in which "increase and decrease" or "decrease and increase" continues alternately may be determined.

Figure 20:
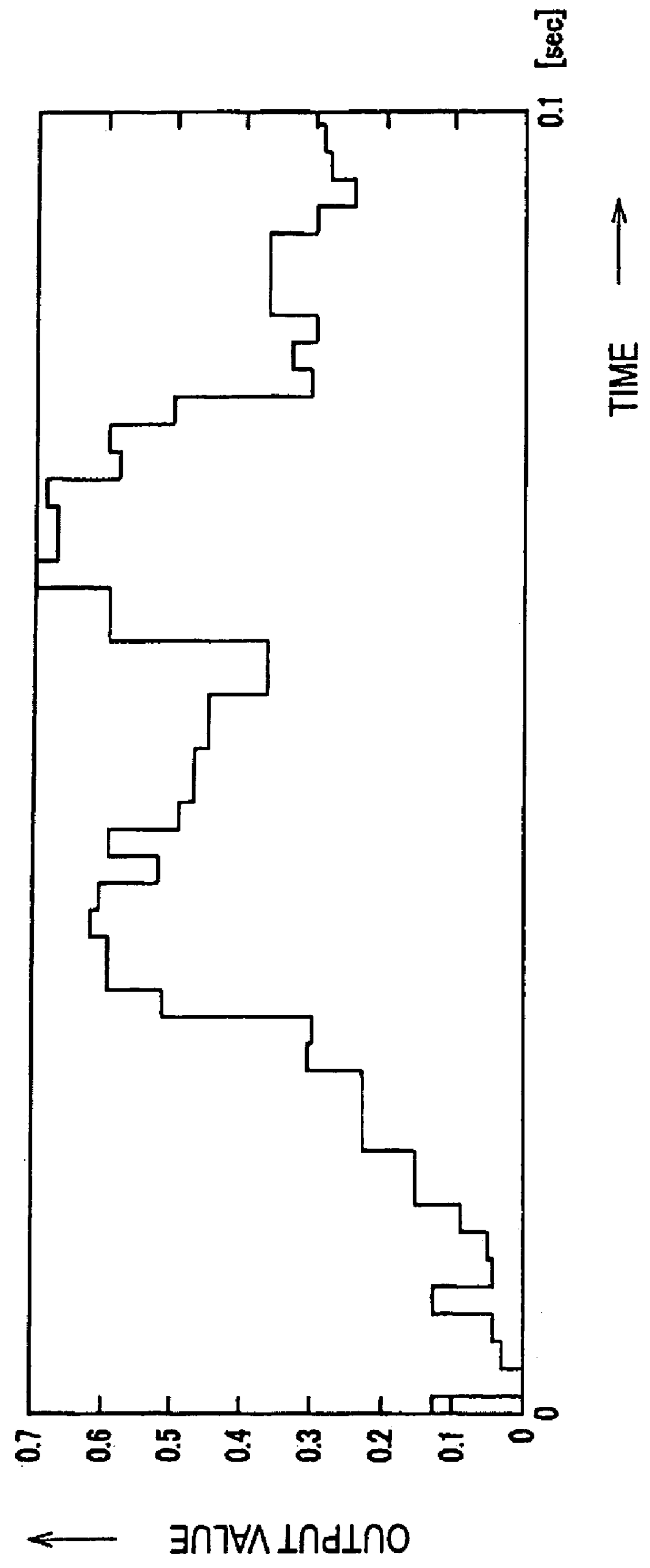
FIG. 20 shows an output value, which is a degree of speech computation result.

FIG. 20 shows an output result (output value) from the degree of speech computation section 30 shown in FIGS. 1 and 2. In this case, in the half-wavelength increase and decrease repetition rate integration section 53 of FIG. 12, the larger value of the output values from the upward half-wavelength increase and decrease repetition rate computation section 51 and the downward half-wavelength increase and decrease repetition rate computation section 52 shown in FIGS. 17 and 18 is output. In the output value adjustment section 54, an adjustment is made using TH=0.6 in equation (1), and the value is made to be an output value from the half-wavelength increase and decrease repetition rate computation section 31. In the output value adjustment section 57 of FIG. 13, the output value shown in FIG. 19 from the zero-cross rate calculation section 56 is adjusted by using TH=0.7 in equation (1), and the value is made to be an output value from the zero-cross rate computation section 32. In the degree of speech output section 33 of FIG. 2, the product of the output value from the half-wavelength increase and decrease repetition rate computation section 31 and the output value from the zero-cross rate computation section 32 is calculated, and the product is made to be an output value from the degree of speech computation section 30 shown in FIG. 20.

According to the above-described embodiment of the present invention, even if ambient sound noise is contained, only speech can be separated. Since ambient sound can be removed even from monaural sound, the present invention can be applied to any sound signal. Furthermore, since simple features are used, a smaller amount of processing is required, and processing in a real time is possible.

Figure 21:
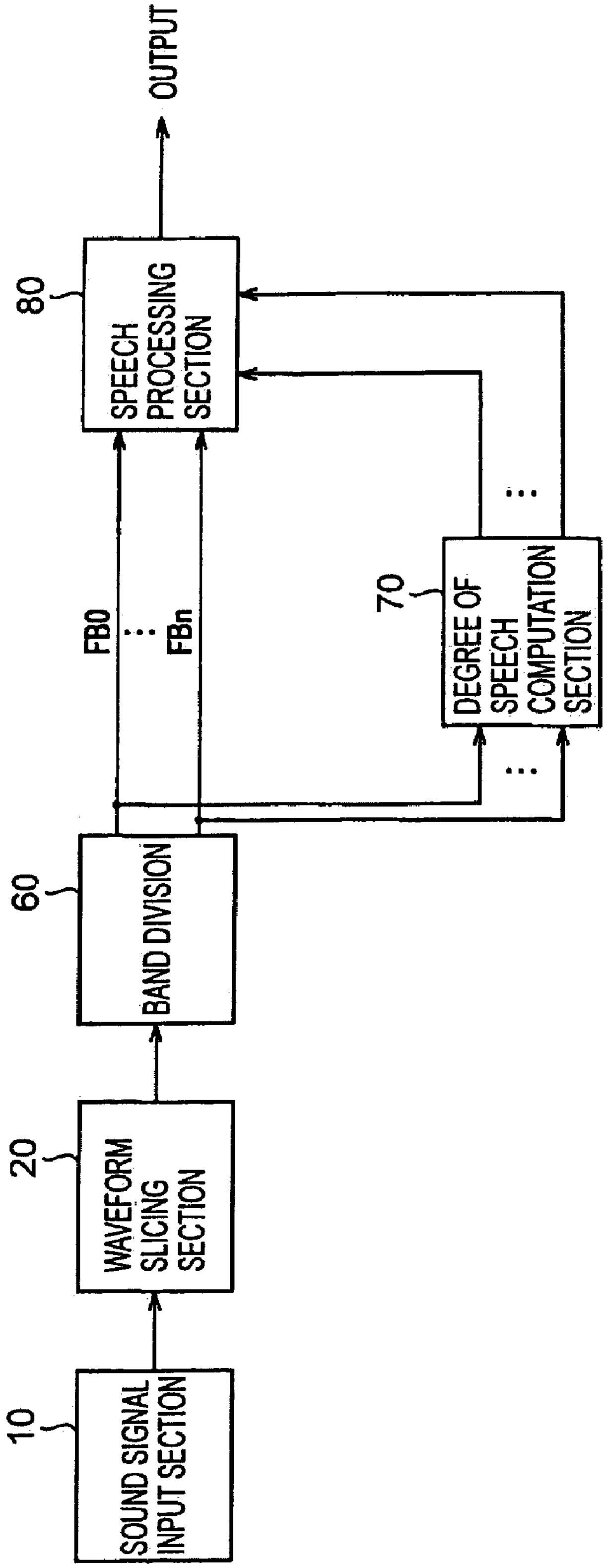
FIG. 21 is a block diagram schematically showing the configuration of a sound signal processing apparatus according to another embodiment of the present invention.

Next, another embodiment of the present invention will be described with reference to FIG. 21. In an example of FIG. 21, a sound signal input from the sound signal input section 10 is sliced in units of a predetermined time length (frame) by the waveform slicing section 20 and thereafter, the sound signal is divided into a plurality of bands by a band division section 60, and processing is performed for each band. That is, in the band division section 60, the sound signal from the waveform slicing section 20 is divided into a plurality of frequency bands FB0 to FBn. In a degree of speech computation section 70, the degree of speech is computed for each of the frequency bands FB0 to FBn. Based on the degree of speech of each of the frequency bands FB0 to FBn, a speech processing section 80 performs processing on a signal of each of the frequency bands FB0 to FBn so as to separate or accentuate/attenuate speech and ambient sound (noise), combines the signal of each of the frequency bands, and outputs the combined signal. For the processing for each frequency band in the degree of speech computation section 70, processing identical to the processing described with reference to FIGS. 2, 12, and 13 is performed. In the degree of speech computation section 70, a configuration identical to that of FIGS. 2, 12, and 13 is provided for each frequency band.

Figure 22:
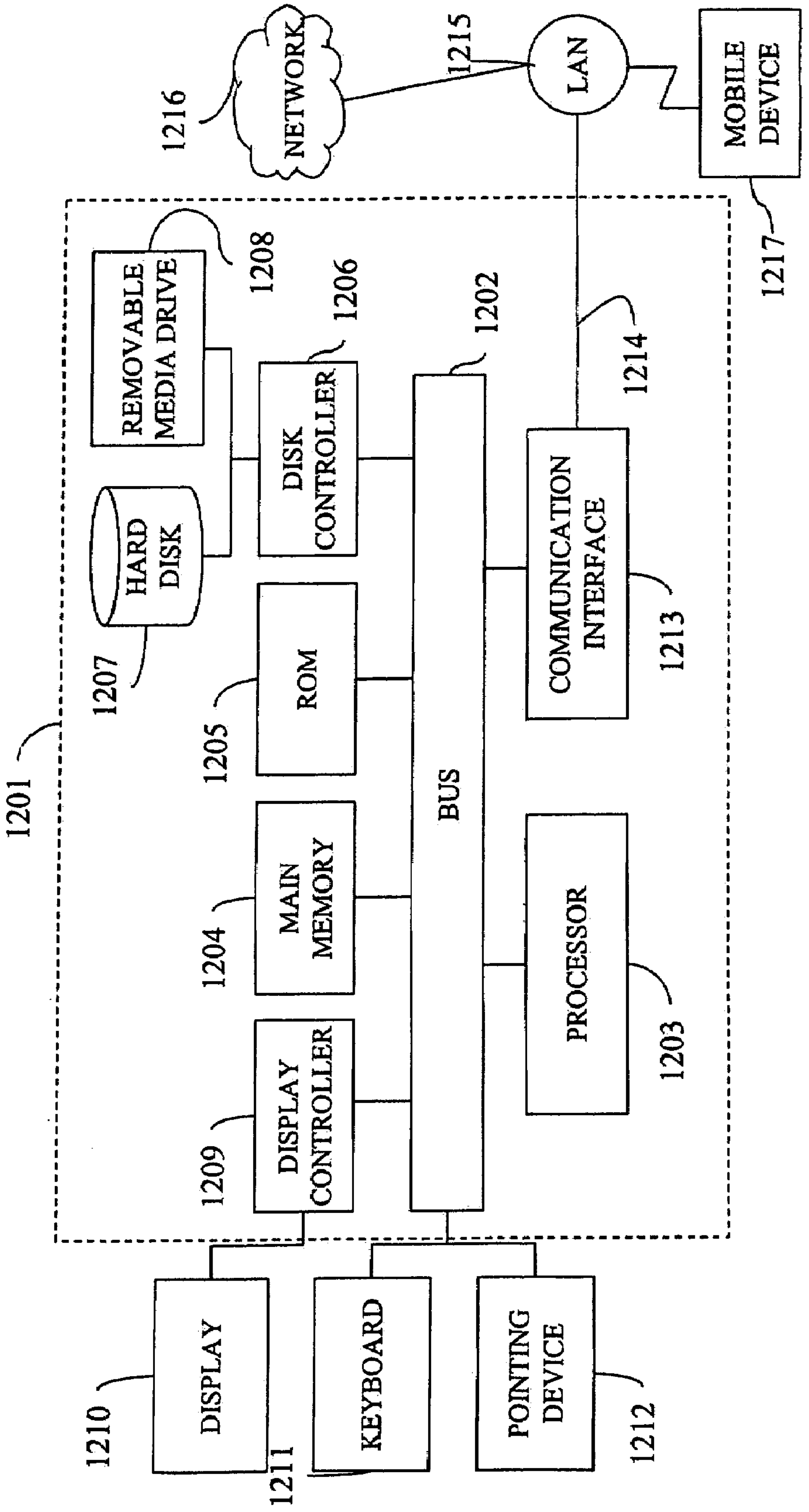
FIG. 22 is a block diagram of a processor-based mechanism for implementing an embodiment of the present invention.

FIG. 22 illustrates a computer system 1201 upon which an embodiment of the present invention may be implemented. Not all of the features shown in FIG. 22 are required to practice the invention, since the invention may also be implemented in a variety of other fashions, included in an embedded processor application. Nevertheless, for illustrative purposes, an example embodiment of an apparatus for hosting the invention is now described in reference to FIG. 22.

The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203. Such memory (or other peripheral device) may be connected via a peripheral interface such as a USB port.

The computer system 1201 also includes a disk controller 1206 coupled to the bus 1202 to control one or more storage devices for storing information and instructions, such as a magnetic hard disk 1207, and a removable media drive 1208 (e.g., USB flash memory, floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The present application contains subject matter related to Japanese patent documents JP2004-045237, JP2004-045238, filed in the JPO on Feb. 20, 2004, JP2005-041169 filed in the JPO on Feb. 17, 2005, and JP2004-194646 filed in the JPO on Jun. 30, 2004, the entire contents of each of which is incorporated herein by reference in its entirety.

What is claimed is:

1. A processor-implemented sound signal processing apparatus comprising:

a sound computation mechanism configured to compute and output an indicia of a degree of vocally generated sound of a sound signal input thereto, said sound signal including a vocally generated sound and ambient sound; and a voice processor configured to characterize the input sound signal based on the indicia of a degree of vocally generated sound output by the sound computation mechanism, wherein the sound computation mechanism is configured to compute the indicia of a degree of vocally generated sound based on features in a wavelength direction of a waveform of the input sound signal;

said sound computation mechanism including a degree of speech computation mechanism comprising:

a half-wavelength increase and decrease repetition rate computation mechanism configured to compute an increase and a decrease in a repetition rate of half wavelengths of a waveform of the sound signal;

a zero-cross rate computation mechanism configured to compute a rate of zero crossings of half wavelengths of the waveform of the sound signal; and a degree of vocally generated sound output mechanism configured to output the indicia of a degree of vocally generated sound on the basis of an output from the half-wavelength increase and decrease repetition rate computation mechanism and an output from the zero-cross rate computation mechanism.

2. The apparatus of claim 1, wherein:

said vocally generated sound is speech; and said voice processor is configured to characterize the input sound signal based on a degree of speech in said sound signal as determined by said sound computation mechanism.

3. The sound signal processing apparatus according to claim 2, wherein the features in the wavelength direction are changes in a duration of a period of waveform of the sound signal.

4. The sound signal processing apparatus according to claim 2, wherein the features in the wavelength direction are changes in a level direction of the waveform of the sound signal.

5. The sound signal processing apparatus according to claim 2, wherein the degree of speech computation mechanism is configured to compute the degree of speech in units of frames sliced in predetermined time length units of the sound signal.

6. The sound signal processing apparatus according to claim 1, wherein the half-wavelength increase and decrease repetition rate computation mechanism is configured to compute the increase and decrease repetition rate of the half wavelength of the waveform based on a rate of a portion of the waveform where an upward half-wavelength of the waveform of the sound signal changes so as to increase and decrease alternately or changes so as to decrease and increase alternately, and based on a rate of a portion where a downward half-wavelength of the waveform of the sound signal changes so as to increase and decrease alternately or changes so as to decrease and increase alternately.

7. The sound signal processing apparatus according to claim 1, wherein the half-wavelength increase and decrease repetition rate computation mechanism includes a first output value adjustment mechanism configured to adjust the repetition rate of the half wavelengths produced by the half-wavelength increase and decrease repetition rate computation mechanism, the zero-cross rate computation mechanism includes a second output value adjustment mechanism configured to adjust the rate of zero-crossings produced by said zero-cross rate computation mechanism, and the first and second output value adjustment mechanisms are configured to adjust and provide respective output values to the sound output mechanism.

8. The sound signal processing apparatus according to claim 2, further comprising:

a band dividing mechanism configured to divide the sound signal into a plurality of frequency bands, wherein the sound computation mechanism is configured to compute the indicia of a degree of vocally generated sound for each band, and the voice processor is configured to process each band on the basis of the computed degree of vocally generated sound of each band.

9. A method for computing an indicia of a degree of vocally generated sound, comprising:

slicing a waveform of an input sound signal in units of frames of a predetermined length;

computing and outputting the indicia of a degree of vocally generated sound of a sound signal input thereto, said sound signal including a vocally generated sound and ambient sound; and characterizing the input sound signal based on the indicia of a degree of vocally generated sound; wherein said computing and outputting includes:

computing the indicia of a degree of vocally generated sound based on features in a wavelength direction of a waveform of the input sound signal, computing an increase and a decrease in a repetition rate of half wavelengths of the waveform sliced in the slicing, computing a rate of zero crossings of half wavelengths of the waveform sliced in the slicing, and determining and outputting the indicia of a degree of vocally generated sound on the basis of an output from the computed increase and decrease in the repetition rate and the computed rate of zero crossings.

10. The method according of claim 9, wherein:

in the computing an increase and decrease in the repetition rate, the increase and decrease repetition rate of the half wavelength is computed on the basis of a rate of a portion of the signal where an upward half-wavelength of the waveform changes so as to increase and decrease alternately or changes so as to decrease and increase alternately, and on the basis of the rate of the portion where a downward half-wavelength of the waveform changes so as to increase and decrease alternately or changes so as to decrease and increase alternately.

11. The method of claim 9, wherein:

the computing an increase and decrease in the repetition rate includes adjusting the repetition rate of half wavelengths, and the computing a rate of zero crossings includes adjusting the rate of zero-crossings.

12. The method of claim 9, further comprising:

dividing the sound signal into a plurality of frequency bands, and computing the indicia of a degree of vocally generated sound for each band.

13. A computer readable storage medium having computer readable instructions that when executed by a processor cause the processor to perform a method comprising:

slicing a waveform of an input sound signal in units of frames of a predetermined length;

computing and outputting the indicia of a degree of vocally generated sound of a sound signal input thereto, said sound signal including a vocally generated sound and ambient sound; and characterizing the input sound signal based on the indicia of degree of vocally generated sound; wherein said computing and outputting includes:

computing the indicia of a degree of vocally generated sound based on features in a wavelength direction of a waveform of the input sound signal, computing an increase and a decrease in a repetition rate of half wavelengths of the waveform sliced in the slicing, computing a rate of zero crossings of half wavelengths of the waveform sliced in the slicing, and determining and outputting the indicia of a degree of vocally generated sound on the basis of an output from the computed increase and decrease in the repetition rate and the computed rate of zero crossings.

14. The computer readable storage medium of claim 13, wherein:

in the computing an increase and decrease in the repetition rate, the increase and decrease repetition rate of the half wavelength is computed on the basis of a rate of a portion of the signal where an upward half-wavelength of the waveform changes so as to increase and decrease alternately or changes so as to decrease and increase alternately, and on the basis of the rate of the portion where a downward half-wavelength of the waveform changes so as to increase and decrease alternately or changes so as to decrease and increase alternately.

15. The computer readable storage medium of claim 13, wherein:

the computing an increase and decrease in the repetition rate includes adjusting the repetition rate of half wavelengths, and the computing a rate of zero crossings includes adjusting the rate of zero-crossings.

16. The computer readable storage medium claim 13, wherein the method further comprising:

dividing the sound signal into a plurality of frequency bands, and computing the indicia of a degree of vocally generated sound for each band.

17. A processor-implemented sound signal processing apparatus comprising:

means for slicing a waveform of an input sound signal in units of frames of a predetermined length;

means for computing and outputting an indicia of a degree of vocally generated sound of a sound signal input thereto from the means for slicing, said sound signal including a vocally generated sound and ambient sound; and means for characterizing the input sound signal based on the indicia of a degree of vocally generated sound, wherein said means for computing includes:

means for calculating the indicia of a degree of vocally generated sound based on features in a wavelength direction of a waveform of the input sound signal, and a degree of speech computing means comprising:

a half-wavelength increase and decrease repetition rate computing means for computing an increase and a decrease in a repetition rate of half wavelengths of a waveform of the sound signal;

a zero-cross rate computing means for computing a rate of zero crossings of half wavelengths of the waveform of the sound signal; and a degree of vocally generated sound outputting means for outputting the indicia of a degree of vocally generated sound on the basis of an output from the half-wavelength increase and decrease repetition rate computing means and an output from the zero-cross rate computing means.

* * * * *